United States Patent
Kato et al.

(10) Patent No.: US 7,639,428 B2
(45) Date of Patent: *Dec. 29, 2009

(54) OPTICAL ELEMENT AND IMAGE TAKING APPARATUS

(75) Inventors: Takashi Kato, Minami-Ashigara (JP); Yoshihiro Ito, Asaka (JP); Nobuaki Nago, Asaka (JP); Hitoshi Miyano, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 762 days.

This patent is subject to a terminal disclaimer.

(21) Appl. No.: 11/210,763

(22) Filed: Aug. 25, 2005

(65) Prior Publication Data
US 2006/0044448 A1    Mar. 2, 2006

(30) Foreign Application Priority Data

| Aug. 25, 2004 | (JP) | ............................. 2004-244868 |
| Aug. 25, 2004 | (JP) | ............................. 2004-244872 |
| Mar. 9, 2005 | (JP) | ............................. 2005-065379 |
| Aug. 19, 2005 | (JP) | ............................. 2005-238423 |

(51) Int. Cl.
*G02B 1/06* (2006.01)
(52) U.S. Cl. ...................... 359/666; 359/245
(58) Field of Classification Search ................. 359/666, 359/245
See application file for complete search history.

(56) References Cited

U.S. PATENT DOCUMENTS

| 7,212,329 B2 * | 5/2007 | Ito et al. ...................... 359/296 |
| 7,215,480 B2 * | 5/2007 | Ito et al. ...................... 359/666 |
| 7,265,910 B2 * | 9/2007 | Ito et al. ...................... 359/666 |
| 2005/0088759 A1 * | 4/2005 | Nishioka et al. ............ 359/726 |

FOREIGN PATENT DOCUMENTS

| JP | 5-173193 A | 7/1993 |
| JP | 2001-504794 A | 4/2001 |
| JP | 2002-341311 A | 11/2002 |
| WO | WO 98/23796 A1 | 6/1998 |

OTHER PUBLICATIONS

"Philips Fluid Lenses", Digital Photography Review, www.dpreview.com, 3 pages.

* cited by examiner

*Primary Examiner*—Jordan M. Schwartz
*Assistant Examiner*—James C Jones
(74) *Attorney, Agent, or Firm*—Sughrue Mion, PLLC

(57) ABSTRACT

An optical element including: a container which is light-transmissive at least in a light passage region; a light-transmissive dispersion medium enclosed in the container; a light-transmissive dispersion dispersed in the dispersion medium and having a refractive index different from the refractive index of the dispersion medium; and an electromagnetic field generator which controls the refraction of light passing through the light passage region by moving the dispersion dispersed in the dispersion medium by an electromagnetic force.

2 Claims, 31 Drawing Sheets

OPTICAL ELEMENT AND IMAGE TAKING APPARATUS

BACKGROUND OF THE INVENTION

1. Field of the Invention

The present invention relates to an optical element capable of changing its focal length and to an image taking apparatus which takes an image of a subject.

2. Description of the Related Art

As a variable-focus lens capable of changing the focal length, a liquid crystal lens capable of changing the focal length by using the electro-optic effect of a liquid crystal is known. For example, Japanese Patent Laid-Open No. 2002-341311 (patent document 1) discloses a liquid crystal lens having first and second light-transmissive substrates in the form of a flat plate, a third light-transmissive substrate having two concave surfaces and provided between the first and second light-transmissive substrates, and a liquid crystal enclosed in each of a space between the first and third light-transmissive substrates and a space between the second and third light-transmissive substrates. In this liquid crystal lens, the orientation of liquid crystal molecules is changed according to the level of an applied voltage to change the refractive index of the liquid crystal lens. The focal length of the lens is thereby changed.

A fluid lens which can be changed in shape by application of a voltage to change its focal length is also known as a variable-focus lens. For example, a fluid lens in which an immiscible fluid constituted of a non-electroconductive oil and an electroconductive aqueous solution is enclosed in a tube having its inner wall surface covered with a water-repellent coating is proposed in "Philips' Fluid Lenses", [online], Mar. 3, 2004, Royal Philips Electronics, [found on Mar. 31, 2004], Internet <URL: http://www.dpreview.com/news/0403/04030302philipsfluidle ns.asp> (non-patent document 1). In this fluid lens, when no voltage is applied, the aqueous solution constituting the immiscible fluid is a semispherical mass and the interface of the aqueous solution on the oil is convex. This interface changes between the convex state and a concave state according to the level of the applied voltage. Consequently, the radius of curvature of the lens can be changed and the focal length of the lens is freely variable.

In the technique disclosed in the patent document 1, the focal length of the lens is changed by using the difference $\Delta n$ ($n\|-n\bot$) between the refractive index ($n\|$) in the major-axis direction and the refractive index ($n\bot$) in the minor-axis direction of liquid crystal molecules. However, there is a problem that the difference $\Delta n$ is so small that the refractive index of the lens cannot be freely changed.

In the technique proposed in the non-patent document 1, the focal length of the fluid lens is changed by applying a voltage to the immiscible fluid. When a voltage is applied to the immiscible fluid, a current flows through the aqueous solution constituting the immiscible fluid. Therefore, there is a risk of the aqueous solution being decomposed by electrolysis to generate hydrogen and oxygen, and there is a problem that during use over a long time period a gas constituted of generated hydrogen and oxygen is accumulated to form bubbles which scatter light and deteriorate the performance of the lens.

The above-described problems arise generally with optical elements such as plane-parallel plates and prisms as well as with lenses.

SUMMARY OF THE INVENTION

The present invention has been made in view of the above circumstances and provides an optical element capable of freely changing the refractive power and operating with a reduced deterioration in performance, and an image taking apparatus using the optical element.

The present invention provides an optical element having: a container which is light-transmissive at least in a light passage region; a light-transmissive dispersion medium enclosed in the container; a light-transmissive dispersoid dispersed in the dispersion medium and having a refractive index different from the refractive index of the dispersion medium; and an electromagnetic field generator which controls the refraction of light passing through the light passage region by moving the dispersoid dispersed in the dispersion medium by an electromagnetic force.

In the optical element of the present invention, a dispersoid which is dispersed in a light-transmissive dispersion medium enclosed in a container, which is light-transmissive, and which has a refractive index different from the refractive index of the dispersion medium, is moved by an electromagnetic force, thereby controlling the refraction of light passing through a light passage region. The optical element of the present invention can therefore be obtained as a variable-focal-length optical element having a focal length according to a refractive index determined by the dispersion medium and the amount of dispersoid moved in the light passage region by the electromagnetic force. The dispersoid dispersed in the dispersion medium is moved by an electric field or a magnetic field generated by the electromagnetic field generator. No current is caused in the dispersion medium. Therefore, the optical element of the present invention is capable of reducing the risk of electrolysis and limiting the deterioration of the lens performance over a long time period in comparison with the technique that is proposed in the nonpatent document 1, and that entails a current flowing through an electroconductive aqueous solution.

Preferably, the electromagnetic field generator in the optical element of the present invention is an electrode with which electrophoresis of the dispersoid is effected.

In the electrophoretic optical element using this electrophoresis, electrophoresis of the dispersoid is caused by the electric field applied from the electrodes, thereby controlling the focal length. The amount of the dispersoid moved by electrophoresis can be freely controlled according to the waveform and the pattern of a voltage applied to the electrodes, the placement, shape and structure of the electrodes, and other factors. Therefore, the refractive index distribution can be determined with flexibility in comparison with the technique of controlling the refraction of light by using the refractive index of liquid crystal molecules as proposed in the patent document 1.

Preferably, the dispersoid in the electrophoretic optical element of the present invention is constituted of titanium oxide.

If the dispersoid is constituted of titanium oxide, an optical element having a high refractive index can be realized. Also, since titanium oxide nanoparticles are generally used, they are easily available as a material for manufacture of the optical element.

A dispersoid constituted of alumina is also preferred as the electrophoretic optical element of the present invention.

If the dispersoid is constituted of alumina, the cost of the dispersoid can be reduced.

Preferably, the dispersion medium in the electrophoretic optical element of the present invention is an organic dispersion medium.

If the dispersion medium is an organic dispersion medium, the electrical stability of the dispersion medium is improved.

Further, preferably, the dispersion medium in the electrophoretic optical element of the present invention is a hydrocarbon-based organic dispersion medium.

If the dispersion medium is a hydrocarbon-based organic dispersion medium, the electrical stability is further improved in comparison with organic dispersion mediums having functional groups.

Preferably, in the electrophoretic optical element of the present invention, an inner surface of each electrode is coated with an insulating film which is placed adjacent to the dispersion medium.

Agglomeration of the dispersoid on the electrodes can be prevented in this way.

Further, the insulating film in the electrophoretic optical element of the present invention is preferably a polyimide insulating film.

Electrodes having improved heat resistance and durability can be obtained by using a polyimide insulating film.

In the electrophoretic optical element of the present invention, the dispersoid may be charged particles, and an electrode having such a polarity as to attract the dispersoid may be placed in such a position on the container as to surround the light passage region.

If such an arrangement is adopted, the dispersoid can be expelled from the light passage region according to the voltage applied to the electrode placed in such a position on the container as to surround the light passage region.

Further, in the electrophoretic optical element of the present invention, the dispersoid may be charged particles, and an electrode having such a polarity as to attract the dispersoid may be placed in the light passage region of the container.

If such an arrangement is adopted, the dispersoid can be moved into or expelled from a region which contributes to the refractive power of the lens light passage region, according to the voltage applied to the electrode placed in the light passage region of the container.

Preferably, dispersoid in the optical element of the present invention is magnetic and the electromagnetic field generator is a magnetic field generator which causes magnetophoresis of the dispersoid.

In the magnetophoretic optical element using this magnetophoresis, the focal length is controlled by effecting magnetophoresis of the magnetic dispersoid dispersed in the dispersion medium instead of electrophoresis. While control of an electric field is required for electrophoresis of the dispersoid, control of a magnetic field easier than control of an electric field suffices for magnetophoresis of the magnetic dispersoid. The light output angle and/or output direction can be reliably controlled in this case.

Preferably, dispersoid in the magnetophoretic optical element of the present invention is constituted of titanium-cobalt oxide.

Titanium-cobalt oxide can form magnetic particles having high optical transmissivity and easily producible.

Preferably, the dispersoid in the optical element of the present invention is nanoparticles.

Electrophoresis of the dispersoid can be effected even in a case where the dispersoid is nanoparticles.

In a preferable mode of implementation of the optical element of the present invention, the dispersoid is nanoparticles having a particle size of 5 to 100 nm.

If the dispersoid is nanoparticles having a particle size of 5 to 100 nm, scattering of light can be avoided and the desired light transmissivity can be maintained. Also, nanoparticles having a particle size in this range can be easily handled.

Preferably, the dispersion medium in the optical element of the present invention is water.

If the dispersion medium is water, the dispersibility of the dispersion medium is high and the cost of the dispersion medium is reduced.

Preferably, at least the light passage region of the container in the optical element of the present invention is formed of a plastic.

A lightweight container having high impact resistance can be obtained in this way.

Preferably, the container in the optical element of the present invention has the shape of a lens.

If the container in the optical element has the shape of a lens, the optical element can be used as a focusing lens, a zoom lens or the like.

Preferably, in the optical element of the present invention, at least the light passage region of the container has the shape of a lens with a positive refractive power.

If the container is formed in this manner, the variable-focus lens of the present invention can be used as a convex variable-focus lens.

Preferably, in the optical element of the present invention, at least the light passage region of the container has the shape of a lens with a negative refractive power.

If the container is formed in this manner, the variable-focus lens of the present invention can be used as a concave variable-focus lens.

In the optical element of the present invention, at least the light passage region of the container may have the shape of an aspheric lens.

If the container is formed in this manner, the variable-focus lens of the present invention can be used as an aspheric variable-focus lens.

A container having the shape of a flat plate is also preferred as the container in the optical element of the present invention.

If the container has the shape of a flat plate, the optical distance to a subject can be changed.

A container having the shape of a prism is also preferred as the container in the optical element of the present invention.

According to this preferable mode of implementation of the optical element of the present invention, a variable-focal-length prism can be realized.

The present invention also provides an image taking apparatus including: an image taking lens which includes the optical element according to claim 1, and which performs focal distance adjustment and focusing by means of the optical element, wherein an image signal is generated by performing an image taking operation including capturing subject light which enters the image taking apparatus through the image taking lens.

The image taking apparatus of the present invention is capable of taking a high-quality picture while ensuring accurate control of the focal length of the optical element over a long time period.

Only a basic form of the image taking apparatus of the present invention is described here. Limitation of the description to the basic form is intended only for avoidance of redundancy. The image taking apparatus of the present invention includes various forms corresponding to the above-described various forms of the optical elements as well as the basic form.

According to the present invention, a variable-focus lens capable of freely changing the refractive power and operating with a reduced deterioration in performance and an image taking apparatus using the optical element can be provided.

DETAILED DESCRIPTION OF THE INVENTION

The present invention will be described with respect to embodiments thereof.

Optical elements in accordance with the present invention are roughly divided into electrophoretic optical elements capable of changing the focal length by causing electrophoresis of a dispersoid dispersed in a dispersion medium, and magnetophoretic optical elements capable of changing the focal length by causing magnetophoresis of a dispersoid. An electrophoretic optical element is first described.

Description will first be made of an electrophoretic optical element having the shape of a lens.

Figure 1:
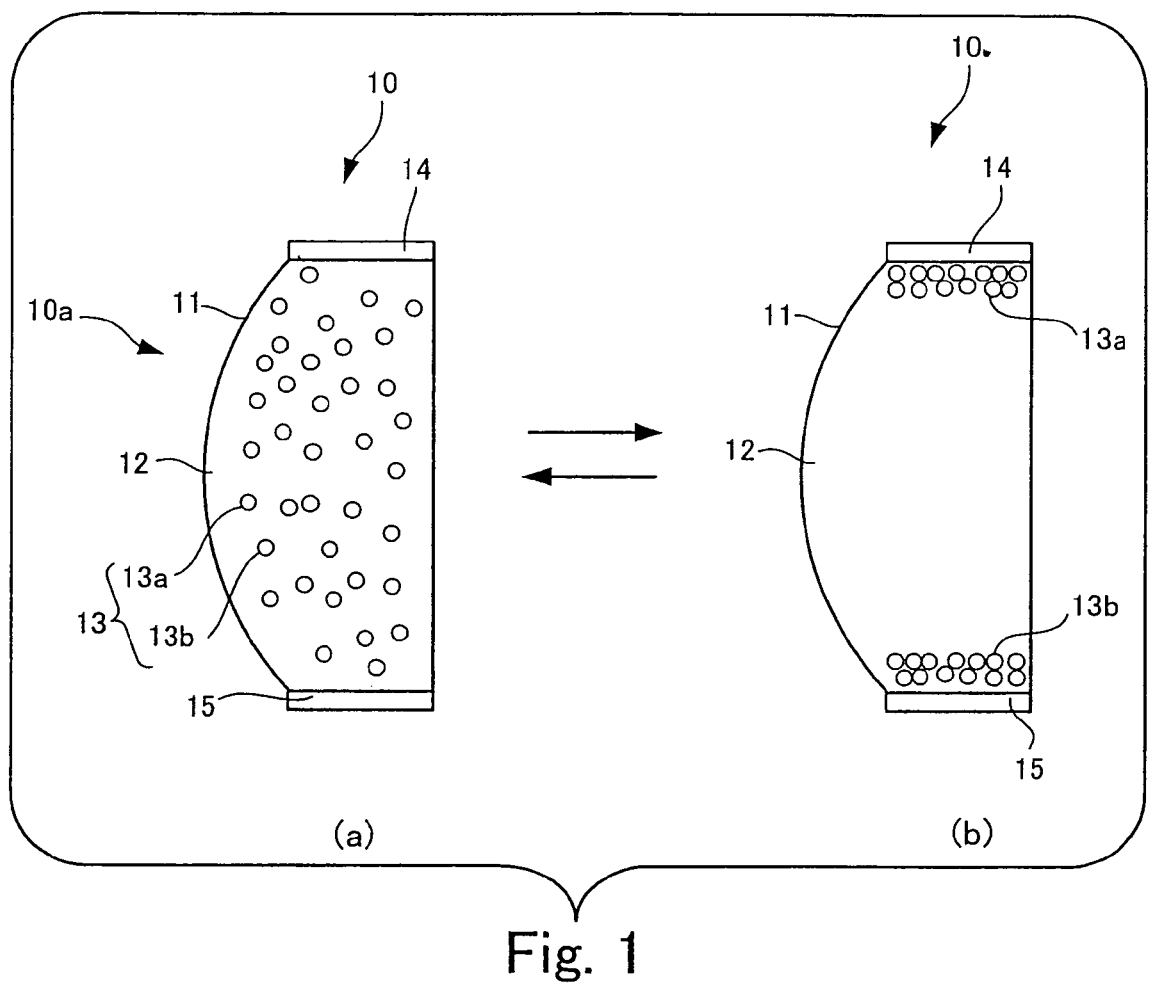
FIG. 1 is a diagram showing a sectional configuration of a variable-focus lens in a first embodiment of the present invention.

FIG. 1 is a diagram showing a sectional configuration of a variable-focus lens which is a first embodiment of the optical element of the present invention.

The variable-focus lens 10 shown in part (a) and part (b) of FIG. 1 has a container 11 which is light-transmissive at least in a light passage region 10a, and which has the shape of a lens. The container 11 corresponds to an example of the container according to the present invention. At least the light passage region 10a of the container 11 has the shape of a lens having a convex outer surface.

In the variable-focus lens 10, a light-transmissive dispersion medium 12 enclosed in the container 11 is provided. The dispersion medium 12 is an example of the dispersion medium in accordance with the present invention.

In the variable-focus lens 10, a dispersoid 13 is also provided which is dispersed in the dispersion medium 12, which is light-transmissive, and which has a refractive index higher than that of the dispersion medium 12. The dispersoid 13 is an example of the dispersoid in accordance with the present invention. In general, a dispersion is constituted of a dispersion medium and a dispersoid. The dispersoid is, for example, particles.

The variable-focus lens 10 also has a cathode 14 and an anode 15 which are electrodes for controlling the refraction of light passing through the light passage region 10a by effecting electrophoresis of the dispersoid 13 dispersed in the dispersion medium 12. More specifically, the dispersoid 13 is nanoparticles 13a positively charged and nanoparticles 13b negatively charged (an example of the charged particles in accordance with the present invention). The cathode 14, which is a negative electrode for attracting the dispersoid 13, and the anode 15, which is a positive electrode for attracting the dispersoid 13, are placed in such positions as to surround the light passage region 10a in the container 11.

Any material may be used as the material of the nanoparticles. The nanoparticles are, for example, particles of silica, alumina, zirconia, titanium oxide, tungsten oxide, zinc oxide, tin oxide or barium titanate. Preferably, the nanoparticles are particles of titanium oxide, silica gel ($SiO_2$), alumina or a polymer. The nanoparticles may be prepared by any of a solid phase method, a liquid phase method and a vapor phase method. Preferably, a liquid phase method or a vapor phase method is used. A method suitable for preparation of the nanoparticles is described in detail in a document "Preparation of Nanoparticles and Control of and Evaluation of Dispersion and Agglomeration of Nanoparticles, Technical Information Institute Co., Ltd., 2003". The particle size is preferably 100 nm or less. If the particle size exceeds 100 nm, scattering of light occurs to impair the transparency (transmissivity).

It is preferable to modify the surface of the nanoparticles for the purpose of improving the stability of dispersion in the dispersion medium 12. Examples of a method of modifying the surface are a method using a titanium coupling agent (such as isopropyl triisostearoyl titanate), a silane coupling agent (such as pentadecafluorodecyl trimethylsilane) or an aluminum coupling agent (such as acetoalkoxyaluminum diisopropylate) and graft polymerization. Polyethylene graft polymerization or polystyrene graft polymerization may be used as graft polymerization on titanium oxide. Graft polymerization using a silanol group may be used as graft polymerization on silica gel.

As the dispersion medium 12 in which the nanoparticles are dispersed, water or a non-aqueous organic dispersion medium may be used. A mixture of water and an organic dispersion medium may also be used. Examples of a non-aqueous organic dispersion medium preferably used as the dispersion medium 12 are hydrocarbons (such as hexane, heptane, pentane, octane and ISOPAR (a product from Exxon Corporation)), hydrocarbon aromatic compounds (such as benzene, toluene, xylene, mesitylene and ethylbenzene), halogen hydrocarbons (such as difluoropropane, dichloroethane, chloroethane and bromoethane), halogen hydrocarbon aromatic compounds (such as chlorobenzene), ether compounds (such as dibutyl ether, anisole and diphenyl ether), alcohol compounds (such as glycerin), compounds having a carbonyl group (such as propylene carbonate), nitrocompounds (such as nitromethane), nitrile compounds (such as acetonitrile and benzonitrile). Also, water is preferably used as the dispersion medium 12.

Preferably, the refractive index, specific gravity, viscosity, resistivity and dielectric constant of the dispersion medium 12 are adjusted in relation to use of the variable-focus lens 10. This adjustment may be performed by mixing a certain number of dispersion mediums.

Additives including stabilizing agents for stabilization under an acid, an alkali and a salt, a stabilizing agent for stabilization of dispersion, stabilizing agents for antioxidation and ultrasonic absorption, an antibacterial agent and a preservative agent may be added to the dispersion medium 12.

As a member forming the container 11, a glass base plate, a film or a base plate of a high polymer such as polyester, polyimide, polymethyl methacrylate, polystyrene, polypropylene, polyethylene, polyamide, nylon, polyvinyl chloride, polyvinylidene chloride, polycarbonate, polyether sulfone, a silicone resin, a polyacetal resin, a fluororesin, a cellulose derivative or polyolefin, a metallic base plate or an inorganic base plate such as a ceramic base plate is preferably used. The container 11 has a transmissivity of preferably 50% or higher, more preferably 80% or higher.

As the cathode 14 and the anode 15, an electrode member on which a layer of gold, silver, copper, aluminum, magnesium, nickel, platinum, carbon an electroconductive high polymer or a metal oxide typified by tin oxide-indium oxide (ITO), tin oxide or zinc oxide is formed is preferably used. For use on a portion through which light is to be transmitted, transparent electrodes are preferably used. A metal oxide typified by tin oxide-indium oxide (ITO), tin oxide or zinc oxide is preferred.

In the variable-focus lens 10 in the present embodiment, the refraction of light passing through the light passage region 10a is controlled through electrophoresis of the dispersoid 13 which is dispersed in the light-transmissive dispersion medium 12 enclosed in the container 11 having the shape of a lens, and which has a refractive index higher than that of the dispersion medium 12, the electrophoresis being effected according to the voltage applied between the cathode 14 and the anode 15. The variable-focus lens 10 is therefore obtained as a lens having a focal length according to a refractive index determined by the dispersion medium 12 and the amount of movement of the dispersoid 13 in the light passage region 10a caused by electrophoresis, as described below in detail.

When no voltage is applied between the cathode 14 and the anode 15, the dispersoid 13 is uniformly dispersed in the dispersion medium 12, as shown in part (a) of FIG. 1. The dispersoid 13 is constituted of nanoparticles 13a positively charged and nanoparticles 13b negatively charged. The variable-focus lens 10 in this state has a comparatively high refractive index resulting from the refractive index of the dispersion medium 12 and a refractive index determined by the amount (the number of particles) of dispersoid 13 uniformly dispersed in the dispersion medium 12.

When a predetermined voltage is applied between the cathode 14 and the anode 15, the positively charged nanoparticles 13a in the dispersoid 13 uniformly dispersed in the dispersion medium 12 are attracted to the cathode 14 and the negatively charged nanoparticles 13b are attracted to the anode 15, as shown in part (b) of FIG. 1. The variable-focus lens 10 therefore has a comparatively low refractive index determined by the refractive index of the dispersion medium 12 only. When the application of the voltage between the cathode 14 and the anode 15 is stopped, the variable-focus lens 10 is again settled in the state shown in part (a) of FIG. 1.

The amount of the dispersoid 13 moved from the state of being positioned in the light passage region 10a can be freely controlled according to the waveform and the pattern of the voltage applied between the cathode 14 and the anode 15, the placement, shape and structure of the cathode 14 and the anode 15, and other factors. Therefore, more flexible distribution rate can be determined in comparison with the technique of controlling the refraction of light by using the refractive index of liquid crystal molecules as disclosed in the patent document 1. Also, the dispersoid 13 dispersed in the dispersion medium 12 is moved by an electric field produced by applying a voltage between the cathode 14 and the anode 15 and no current is caused therebetween. Therefore, the risk of electrolysis is reduced in comparison of the technique using a current flowing through an electroconductive aqueous solution as proposed in the non-patent document 1. Consequently, the deterioration of the performance of the lens can be limited over a long time period.

A method of changing the refractive index stepwise by electrophoresis will be described. When the nanoparticles (referred to as charged particles) positively charged and negatively charged are moved by electrophoresis, the amount of the moved charged particles can be changed according to the waveform and the pattern of the applied voltage. An optical element capable of changing the refractive index stepwise can be obtained by changing the amount of the charged particles positioned in the light passage region 10a in the variable-focus lens 10. A method of applying a rectangular wave is preferably used to change the amount of charged particles. In a document "IDWO3 Proceedings (Proceedings of the 10th International Display Workshops), p 239, 2003", an example of 4-step-gradation display by electrophoresis is reported. An example of 8-step-gradation display is also reported in "IDWO3 Proceedings, p 243, 2003". It is possible to change the amount of charged particles stepwise by using one of the application methods for the display described in this document.

An embodiment of the variable-focus lens 10 shown in FIG. 1 will be described.

Nanoparticles of titanium oxide were used as dispersoid 13 in the embodiment of the variable-focus lens 10. The titanium oxide nanoparticles were prepared by a method described below. Hydrous titanium oxide was made formless by an alkali, thereafter aged in hydrochloric acid, and formed into particles having a particle size of 10 nm by a heat treatment. The surfaces of the particles were processed by using a titanium coupling agent (isopropyl triisostearoyl titanate) solution. An optical element was made as the variable-focus lens 10 by dispersing the thus-obtained titanium oxide nanoparticles in ISOPAR (a product from Exxon Corporation)

When about 20% by volume of the titanium oxide nanoparticles (having a refractive index of 2.30) were mixed in ISOPAR (having a refractive index of 1.48), the refractive index changed from 1.48 to 1.644. In the case of mixing of about 30% by volume, the refractive index changed from 1.48 to 1.726. By using these mixtures, lenses (mediums containing nanoparticles) having a shape shown in FIG. 2 were made.

Figure 2:
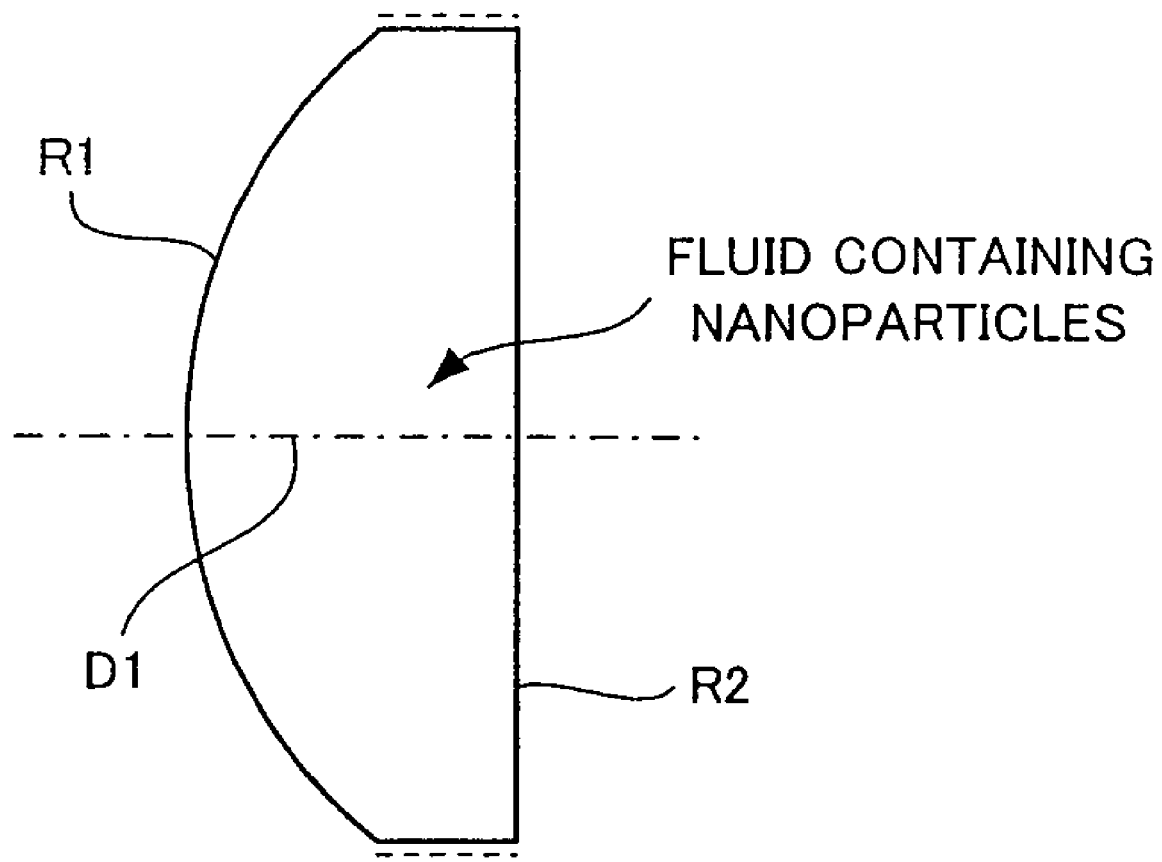
FIG. 2 is a diagram showing the radius of curvature and thickness of a lens having a medium containing nanoparticles.

FIG. 2 is a diagram showing the radius of curvature and thickness of lenses having mediums containing nanoparticles.

Lens curvature R1: 5.00 mm
Lens thickness D1: 3.00 mm
Lens radius curvature R2: infinity
(1_1) In the case where only ISOPAR (refractive index: 1.48) was contained,
Focal length: 10.42 mm
Back focus: 8.39 mm
Front focus: −10.42 mm
(1_2) In the case where 20% of titanium oxide nanoparticles were mixed (refractive index: 1.644)
Focal length: 7.76 mm
Back focus: 5.94 mm
Front focus: −7.76 mm
(1_3) In the case where 30% of titanium oxide nanoparticles were mixed (refractive index: 1.726)
Focal length: 6.89 mm
Back focus: 5.15 mm
Front focus: −6.89 mm Thus, the variable-focus lens was capable of changing the focal length from 10.42 to 7.76 or to 6.89.

Figure 3:
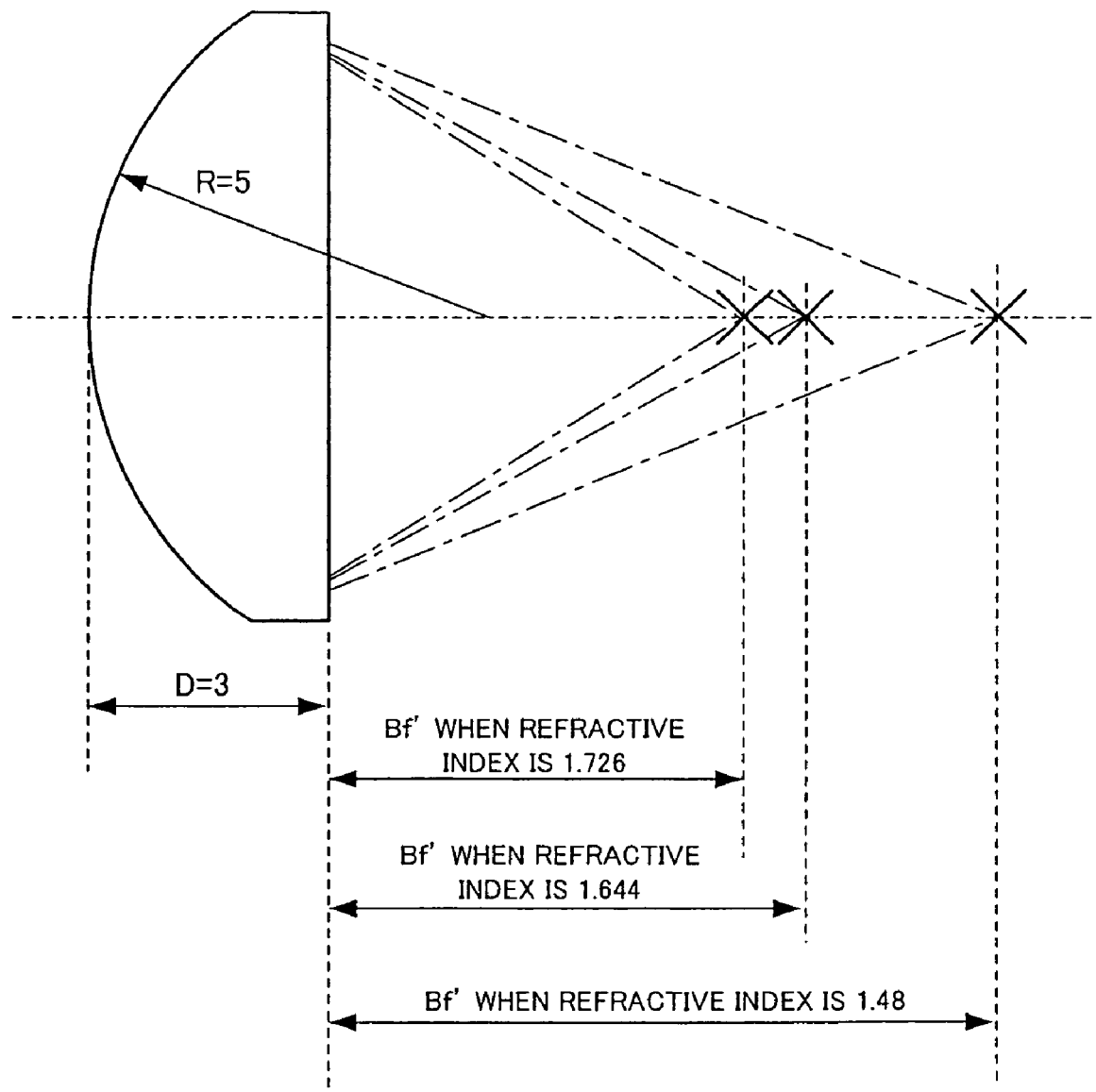
FIG. 3 is a diagram showing the back focus of the variable-focus lens when the refractive index is selectively set to 1.48, 1.644 and 1.726.

FIG. 3 is a diagram showing the back focus of the variable-focus lens when the refractive index was selectively set to 1.48, 1.644 and 1.726.

When the refractive index was selectively set to 1.48, 1.644 and 1.726, the focal length of the variable-focus lens was 10.42, 7.76 and 6.89, as described above. Back focus values corresponding to these focal length values are as shown in FIG. 3. The back focus Bf is maximum (8.39) when the refractive index is 1.48, as shown in FIG. 3. The back focus Bf is reduced (to 5.94 and to 5.15) as the refractive index is changed to 1.644 and to 1.726.

A lens (a medium containing nanoparticles) using a combination of an ordinary glass (BK7; refractive index 1.51633) and the above-described variable-focus lens was made, as described below.

Figure 4:
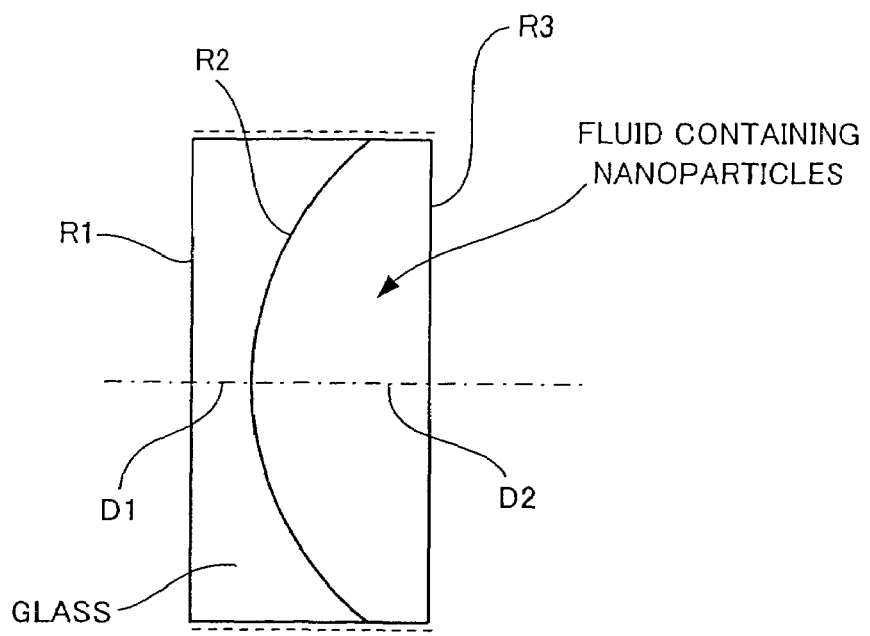
FIG. 4 is a diagram showing the radius of curvature and thickness of a lens using a combination of an ordinary glass and the variable-focus lens.

FIG. 4 is a diagram showing the radius of curvature and thickness of the lens using a combination of the ordinary glass and the variable-focus lens.

Glass radius curvature R1: infinity
Glass thickness D1: 1.00 mm

Lens curvature R2: 5.00 mm
Lens thickness D2: 3.00 mm
Lens radius curvature R3: infinity
(2_1) In the case where only ISOPAR (refractive index: 1.48) was contained,
  Focal length: −137.6 mm
  Back focus: −133.7 mm
  Front focus: 138.3 mm
(2_2) In the case where 20% of titanium oxide nanoparticles were mixed (refractive index: 1.644)
  Focal length: 39.2 mm
  Back focus: 37.3 mm
  Front focus: −38.5 mm
(2_3) In the case where 30% of titanium oxide nanoparticles were mixed (refractive index: 1.726)
  Focal length: 23.8 mm
  Back focus: 22.1 mm
  Front focus: −23.2 mm Thus, the variable-focus lens was capable of changing the focal length from −137.6 to 39.2 or to 23.8.

Further, a lens having nanoparticles enclosed in an ordinary glass (BK7; refractive index 1.51633) was made, as described below.

Figure 5:
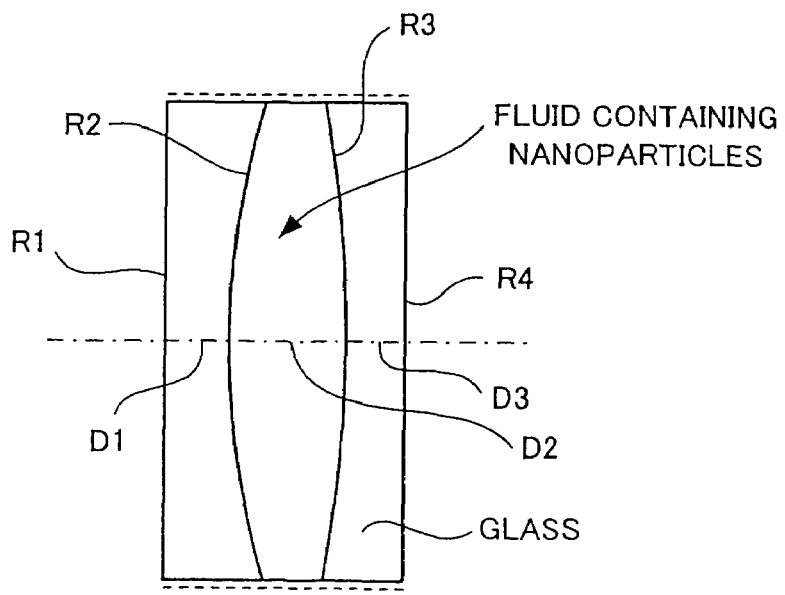
FIG. 5 is a diagram showing the radius of curvature and thickness of a lens having nanoparticles enclosed in an ordinary glass.

FIG. 5 is a diagram showing the radius of curvature and thickness of the lens having nanoparticles enclosed in an ordinary glass.
  First glass radius curvature R1: infinity
  First glass thickness D1: 1.00 mm
  Second glass radius curvature R2: 13.634 mm
  Second glass thickness D2: 2.00 mm (a medium containing nanoparticles)
  Third glass radius curvature R3: −20.2 mm
  Third glass thickness D3: 1.00 mm
  Fourth glass radius curvature R4: infinity
(3_1) In the case where only ISOPAR (refractive index: 1.48) was contained,
  Focal length: −223.7 mm
  Back focus: −225.2 mm
  Front focus: 224.9 mm
(3_2) In the case where 20% of titanium oxide nanoparticles were mixed (refractive index: 1.644)
  Focal length: 64.1 mm
  Back focus: 62.7 mm
  Front focus: −62.9 mm
(3_3) In the case where 30% of titanium oxide nanoparticles were mixed (refractive index: 1.726)
  Focal length: 39.1 mm
  Back focus: 37.7 mm
  Front focus: −38.0 mm Thus, the variable-focus lens was capable of changing the focal length from −223.7 to 64.1 or to 39.1.

Figure 6:
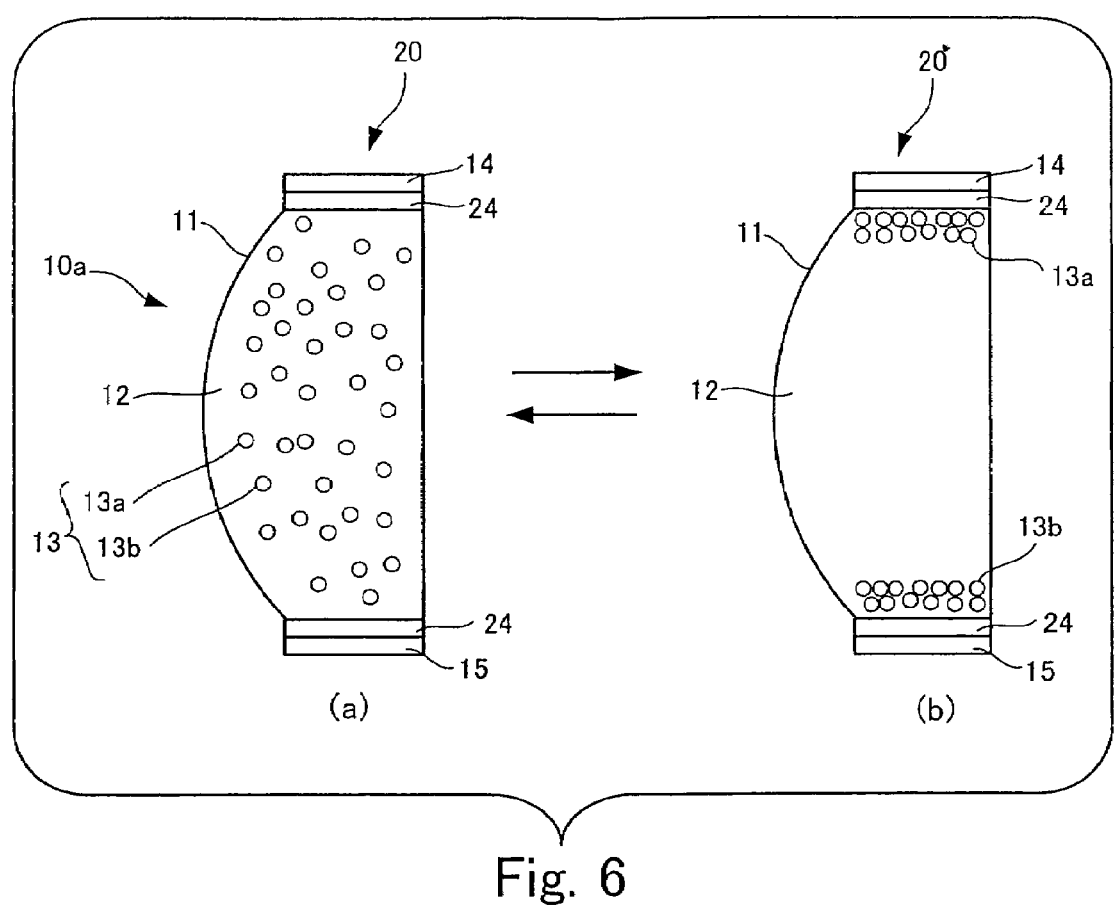
FIG. 6 is a diagram showing a sectional configuration of a variable-focus lens in a second embodiment of the present invention.

FIG. 6 is a diagram showing a sectional configuration of a variable-focus lens 20 which is a second embodiment of the optical element of the present invention.

The same components as those of the variable-focus lens 10 shown in FIG. 1 are indicated by the same reference characters. Description will be made of points of difference from the variable-focus lens 10 shown in FIG. 1.

The variable-focus lens 20 shown in FIG. 6 differs from the variable-focus lens 10 shown in FIG. 1 in that each of the inner surfaces of the cathode 14 and the anode 15 is coated with insulating film 24 which is placed adjacent to the dispersion medium 12. In this variable-focus lens 20, the insulating film 24 provided as a coating on the inner surfaces of the cathode 14 and the anode 15 prevents agglomeration of the dispersoid 13 on the cathode 14 and the anode 15. The insulating film 24 is a polyimide insulating film. Therefore, the cathode 14 and the anode 15 have excellent heat resistance and durability. In the variable-focus lens 20 thus constructed, the refraction of light passing through the light passage region 10a may be controlled through electrophoresis of the dispersoid 13.

Figure 7:
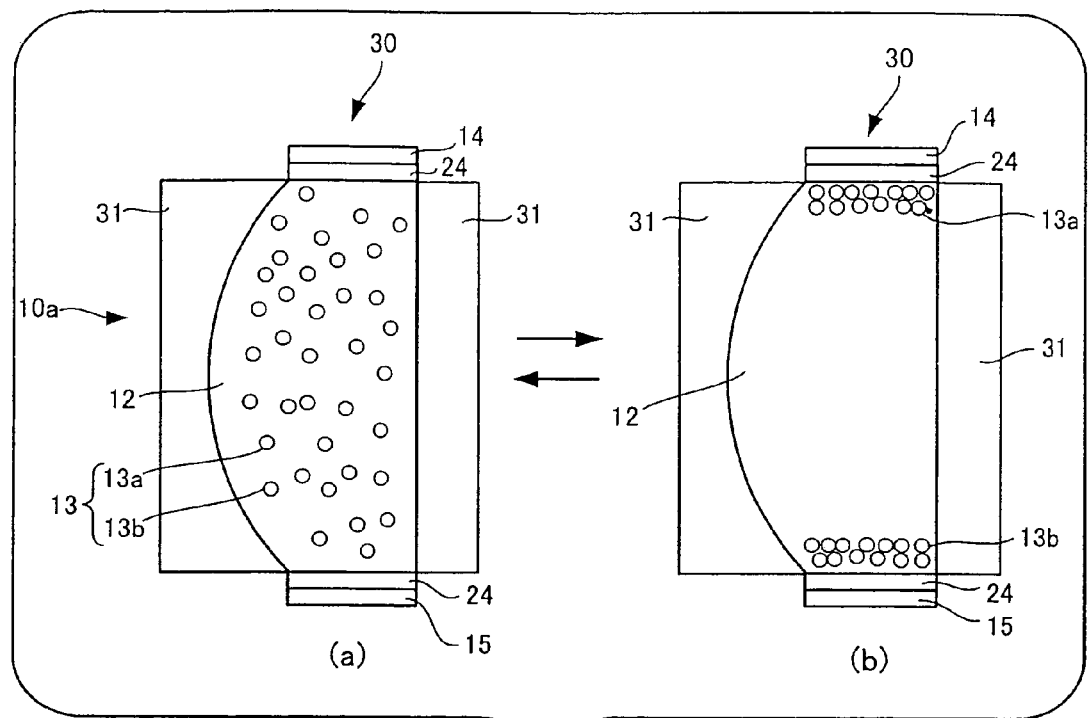
FIG. 7 is a diagram showing a sectional configuration of a variable-focus lens in a third embodiment of the present invention.

FIG. 7 is a diagram showing a sectional configuration of a variable-focus lens which is a third embodiment of the optical element of the present invention.

The same components as those of the variable-focus lens 20 shown in FIG. 6 are indicated by the same reference characters. Description will be made of points of difference from the variable-focus lens 20 shown in FIG. 6.

The variable-focus lens 30 shown in FIG. 7 has a container 31 which is light-transmissive at least in a light passage region 10a, and which has the shape of a lens. At least a portion of the container 31 in the light passage region 10a is formed of a plastic. Therefore, the container 31 can be realized as a light-weight container having high impact resistance. In the variable-focus lens 30 having the thus-formed container 31, the refraction of light passing through the light passage region 10a may be controlled through electrophoresis of the dispersoid 13. The container 31 may be formed of glass instead of being formed of a plastic.

Figure 8:
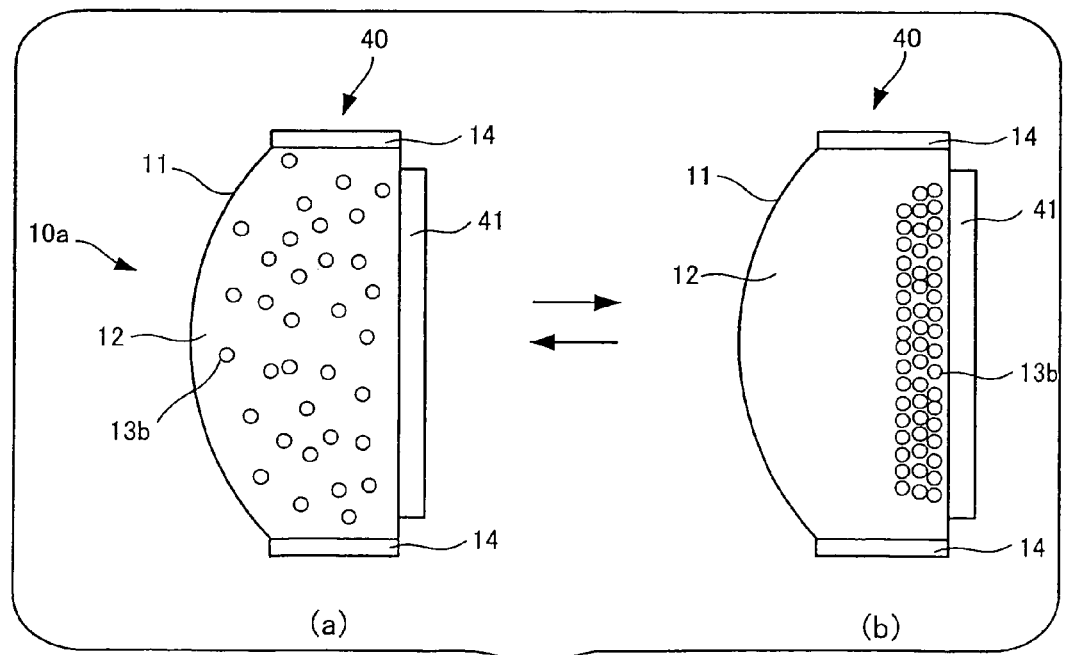
FIG. 8 is a diagram showing a sectional configuration of a variable-focus lens in a fourth embodiment of the present invention.

FIG. 8 is a diagram showing a sectional configuration of a variable-focus lens 40 which is a fourth embodiment of the optical element of the present invention.

The variable-focus lens 40 shown in FIG. 8 has negatively charged nanoparticles 13b dispersed in a dispersion medium 12. The variable-focus lens 40 has a cathode 14 placed in such a position on a container 11 as to surround a light passage region 10a. The variable-focus lens 40 also has an anode 41 for attracting the nanoparticles 13b. The anode 41 is placed on a back surface of the container 11 in the light passage region 10a.

When no voltage is applied between the cathode 14 and the anode 41, the nanoparticles 13b are uniformly dispersed in the dispersion medium 12, as shown in part (a) of FIG. 8. That is, the nanoparticles 13b are uniformly dispersed in a convex portion of the container 11 in the light passage region 10a as well. The variable-focus lens 40 therefore functions as a lens having a positive refractive power. When a predetermined voltage is applied between the cathode 14 and the anode 41, the nanoparticles 13b uniformly dispersed in the dispersion medium 12 are attracted to the anode 41, as shown in part (b) of FIG. 8. At this time, therefore, no nanoparticles 13b are dispersed in the convex portion of the container 11, so that the positive refractive power is reduced. The positive refractive power can be adjusted in this way.

Figure 9:
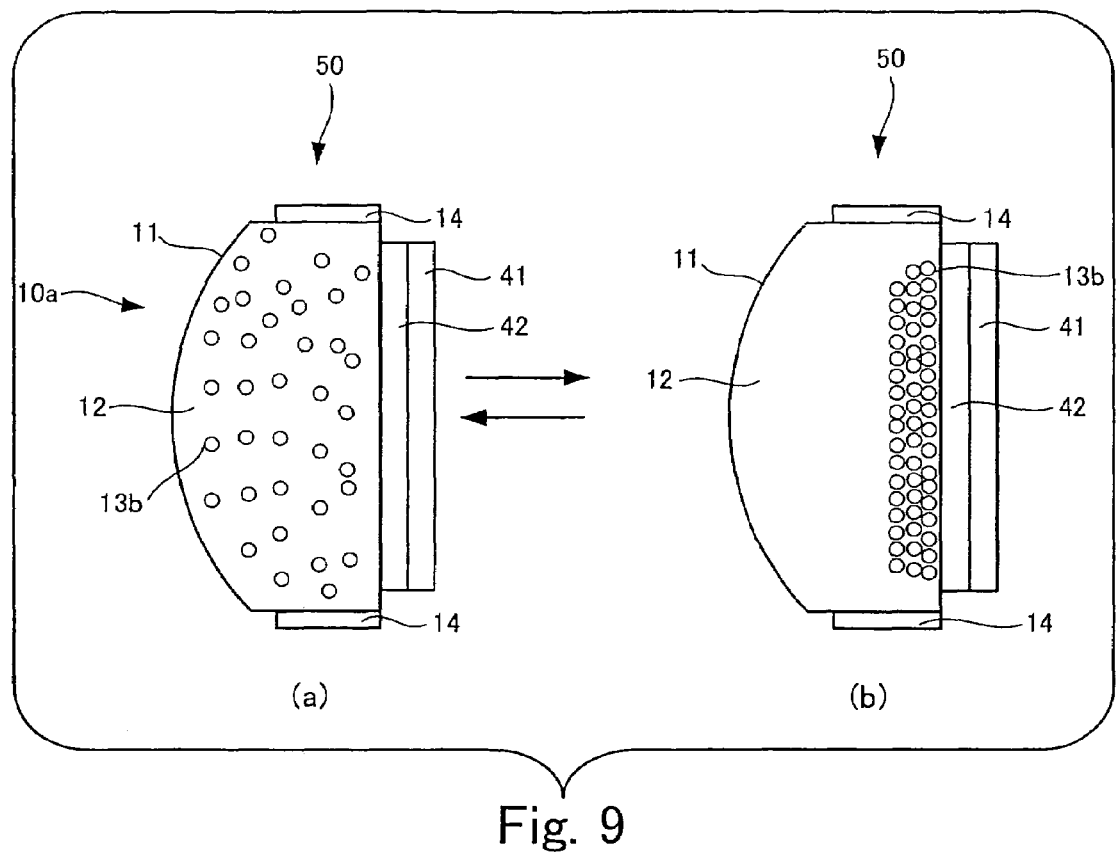
FIG. 9 is a diagram showing a sectional configuration of a variable-focus lens in a fifth embodiment of the present invention.

FIG. 9 is a diagram showing a sectional configuration of a variable-focus lens 50 which is a fifth embodiment of the optical element of the present invention.

The variable-focus lens 50 shown in FIG. 9 differs from the variable-focus lens 40 shown in FIG. 8 in that the inner surface of the anode 41 is coated with insulating film 42 which is placed adjacent to the dispersion medium 12. In this variable-focus lens 50, the insulating film 42 provided as a coating on the inner surface of the anode 41 prevents agglomeration of the nanoparticles 13b on the anode 41. The insulating film 42 is a polyimide insulating film. Therefore, the anode 41 has excellent heat resistance and durability.

Figure 10:
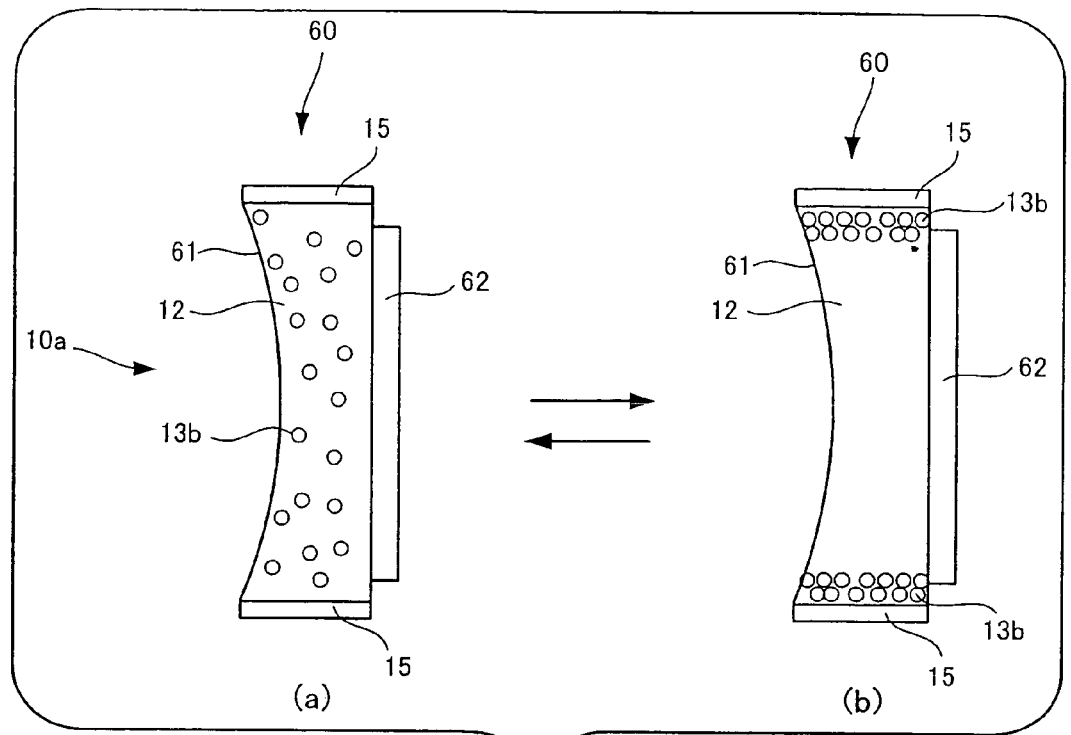
FIG. 10 is a diagram showing a sectional configuration of a variable-focus lens in a sixth embodiment of the present invention.

FIG. 10 is a diagram showing a sectional configuration of a variable-focus lens 60 which is a sixth embodiment of the optical element of the present invention.

The variable-focus lens 60 shown in FIG. 10 has a container 61 which is light-transmissive at least in a light passage region 10a, and which has the shape of a lens. At least the light passage region 10a of the container 61 has the shape of a lens having a concave outer surface.

The variable-focus lens 60 has an anode 15 placed in such a position on the container 61 as to surround the light passage region 10a. The variable-focus lens 60 also has a cathode 62 placed on a back surface of the container 61 in the light passage region 10a.

When no voltage is applied between the anode 15 and the cathode 62, nanoparticles 13b are uniformly dispersed in the dispersion medium 12, as shown in part (a) of FIG. 10. That is, the nanoparticles 13b are uniformly dispersed in a concave portion of the container 61 in the light passage region 10a as well. The variable-focus lens 60 therefore functions as a lens having a negative refractive power. When a predetermined voltage is applied between the anode 15 and the cathode 62, the nanoparticles 13b uniformly dispersed in the dispersion medium 12 are attracted to the anode 15, as shown in part (b) of FIG. 10. At this time, therefore, no nanoparticles 13b are dispersed in the greater part of the concave portion of the container 61 (the portion other than upper and lower portions shown in part (b) of FIG. 10), i.e., in a large portion of the container in the light passage region 10a, so that the negative refractive power is reduced.

Figure 11:
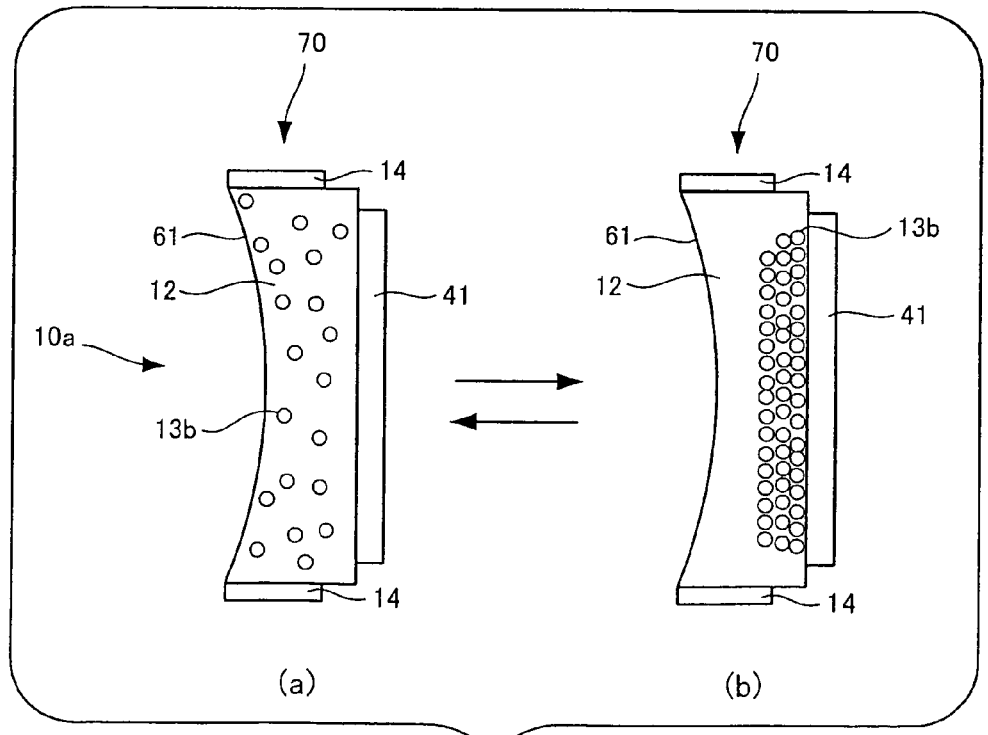
FIG. 11 is a diagram showing a sectional configuration of a variable-focus lens in a seventh embodiment of the present invention.

FIG. 11 is a diagram showing a sectional configuration of a variable-focus lens 70 which is a seventh embodiment of the optical element of the present invention.

The variable-focus lens 70 shown in FIG. 11 has a cathode 14 placed in such a position on a container 61 as to surround a light passage region 10a. The variable-focus lens 70 also has an anode 41 for attracting nanoparticles 13b. The anode 41 is placed on a back surface of the container 61 in the light passage region 10a.

When no voltage is applied between the cathode 14 and the anode 41, nanoparticles 13b are uniformly dispersed in the dispersion medium 12, as shown in part (a) of FIG. 11. That is, nanoparticles 13b are also dispersed uniformly in a concave portion of the container 61 in the light passage region 10a. The variable-focus lens 70 therefore functions as a lens having a negative refractive power. When a predetermined voltage is applied between the cathode 14 and the anode 41, the nanoparticles 13b uniformly dispersed in the dispersion medium 12 are attracted to the anode 41, as shown in part (b) of FIG. 11. At this time, therefore, no nanoparticles 13b are dispersed in the concave portion of the container 61, so that the negative refractive power is reduced.

Figure 12:
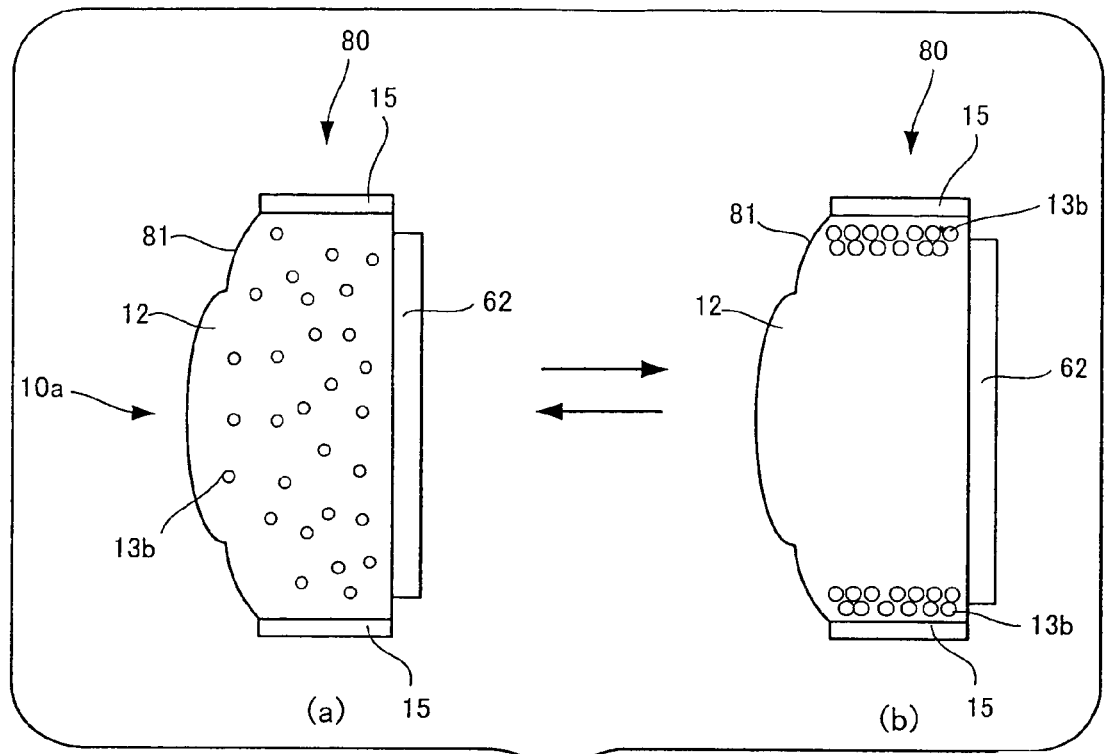
FIG. 12 is a diagram showing a sectional configuration of a variable-focus lens in an eighth embodiment of the present invention.

FIG. 12 is a diagram showing a sectional configuration of a variable-focus lens 80 which is an eighth embodiment of the optical element of the present invention.

A container 81 provided in the variable-focus lens 80 is light-transmissive at least in a light passage region 10a, and at least the light passage region 10a of the container has the shape of an aspheric lens.

When no voltage is applied between an anode 15 and a cathode 62, nanoparticles 13b negatively charged are uniformly dispersed in the dispersion medium 12, as shown in part (a) of FIG. 12. That is, nanoparticles 13b are also dispersed uniformly in the portion of the container 81 having the aspheric lens shape in the light passage region 10a. The variable-focus lens 80 therefore functions as an aspheric lens. When a predetermined voltage is applied between the anode 15 and the cathode 62, the nanoparticles 13b uniformly dispersed in the dispersion medium 12 are attracted to the anode 15, as shown in part (b) of FIG. 12. At this time, therefore, no nanoparticles 13b are dispersed in the portion of the container 81 having the aspheric lens shape, so that the effect of the aspheric lens is reduced.

Figure 13:
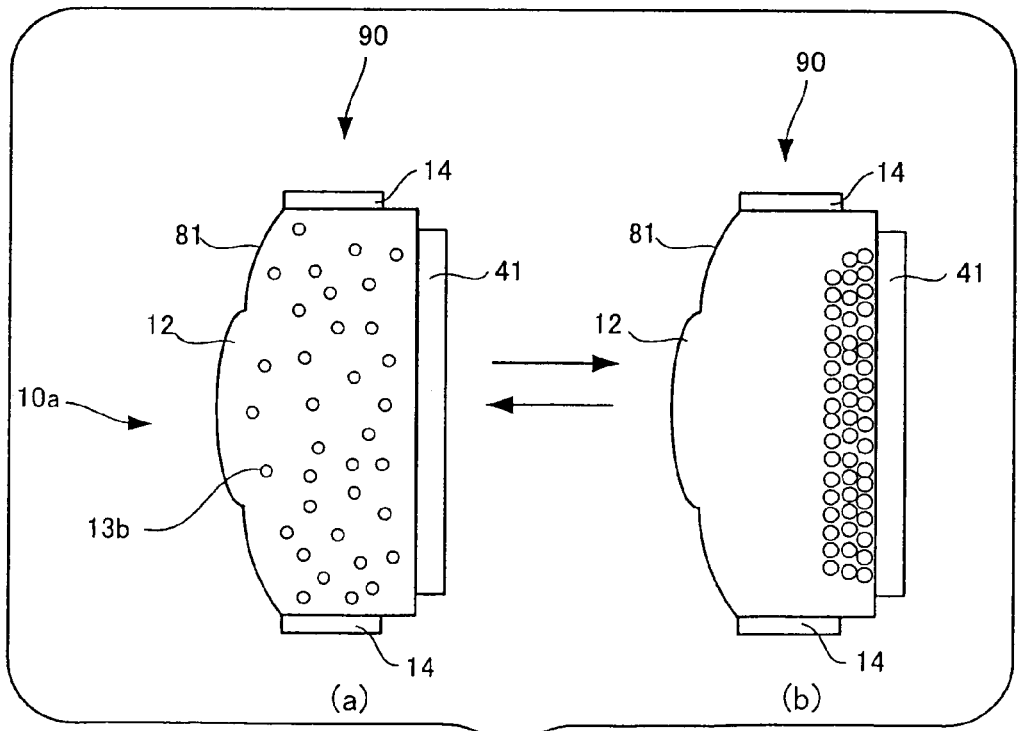
FIG. 13 is a diagram showing a sectional configuration of a variable-focus lens in a ninth embodiment of the present invention.

FIG. 13 is a diagram showing a sectional configuration of a variable-focus lens 90 which is a ninth embodiment of the present invention.

The variable-focus lens 90 shown in FIG. 13 has a cathode 14 placed in such a position on a container 81 as to surround a light passage region 10a. The variable-focus lens 90 also has an anode 41 for attracting nanoparticles 13b. The anode 41 is placed on a back surface of the container 81 in the light passage region 10a.

When no voltage is applied between the cathode 14 and the anode 41, nanoparticles 13b are uniformly dispersed in the dispersion medium 12, as shown in part (a) of FIG. 13. That is, nanoparticles 13b are also dispersed uniformly in the portion of the container 81 having the aspheric lens shape in the light passage region 10a. The variable-focus lens 90 therefore functions as an aspheric lens. When a predetermined voltage is applied between the cathode 14 and the anode 41, the nanoparticles 13b uniformly dispersed in the dispersion medium 12 are attracted to the anode 41, as shown in part (b) of FIG. 13. At this time, therefore, no nanoparticles 13b are dispersed in the portion of the container 81 having the aspheric lens shape, so that the effect of the aspheric lens is reduced.

Figure 14:
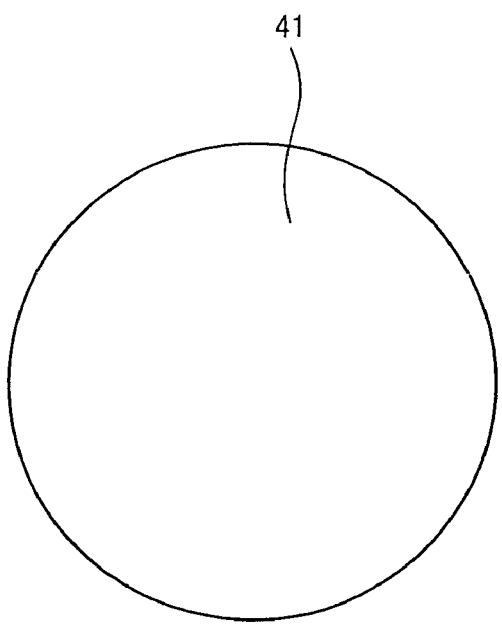
FIG. 14 is a plan view of an anode placed on a back surface in a light passage region of a container constituting a variable-focus lens.

FIG. 14 is a plan view of an anode placed on aback surface in a light passage region of a container constituting a variable-focus lens.

FIG. 14 shows in a plan view an anode 41 placed on a back surface in a light passage region of a container constituting a variable-focus lens. The anode 41 having a circular shape as illustrated may be placed on the back surface of the container in the light passage region to attract negative nanoparticles uniformly distributed in the dispersion medium in the container.

Figure 15:
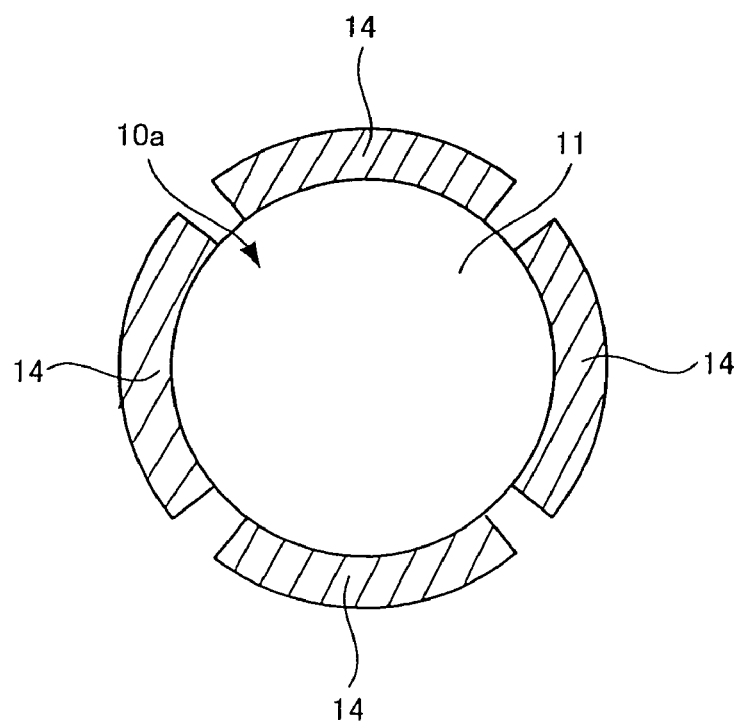
FIG. 15 is a diagram showing a light-entrance-side view of a container constituting a variable-focus lens and cathodes placed in such positions on the container as to surround a light passage region.

FIG. 15 is a diagram showing a light-entrance-side view of a container constituting a variable-focus lens and cathodes placed in such positions on the container as to surround a light passage region.

Four divided cathodes 14 are placed in such positions on the container 11 shown in FIG. 15 as to surround the light passage region 10a. The distribution of positive nanoparticles dispersed in a dispersion medium may be attracted by using four divided cathodes 14 provided in such positions on the container 11 as to surround the light passage region 10a as described above.

Figure 16:
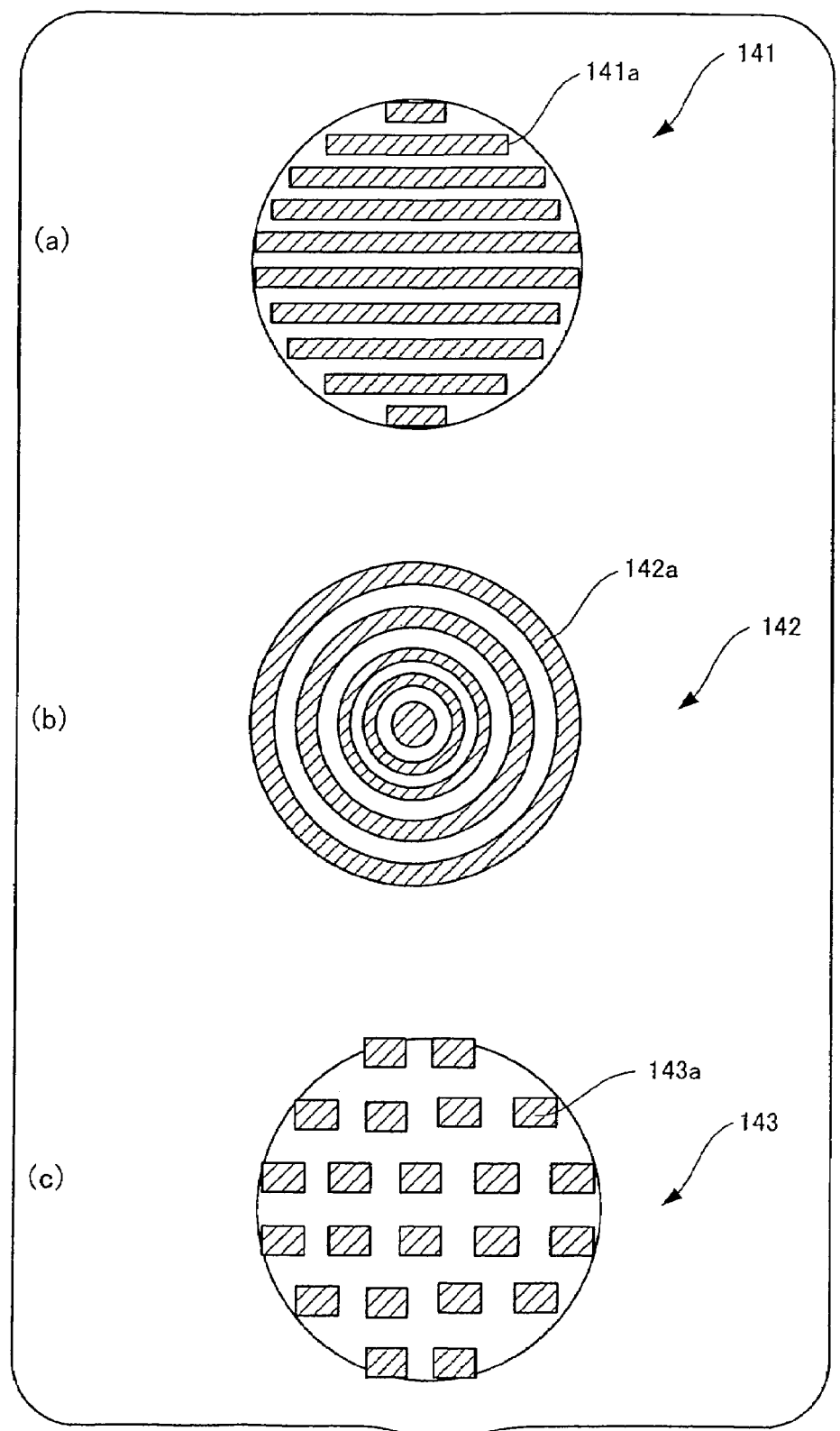
FIG. 16 is a diagram showing examples of various patterns for placement of an anode on a back surface in a light passage region of a container constituting a variable-focus lens.

FIG. 16 is a diagram showing examples of various patterns for placement of an anode on a back surface in a light passage region of a container constituting a variable-focus lens.

An anode 141 shown in part (a) of FIG. 16 has a pattern 141a of electrode elements in the form of horizontal stripes. An anode 142 shown in part (b) of FIG. 16 has a pattern 142a of concentric-circle electrode elements. An anode 143 shown in part (c) of FIG. 16 has a pattern 143a of electrode elements in matrix form. Voltages having various waveforms and various application patterns may be selectively applied to an electrode pattern such as the pattern 141a, 142a or 143a to control the distribution of negative nanoparticles using these anodes 141, 142, and 143. The refractive index of the variable-focus lens may be freely controlled by controlling the distribution of negative nanoparticles in this manner.

Figure 17:
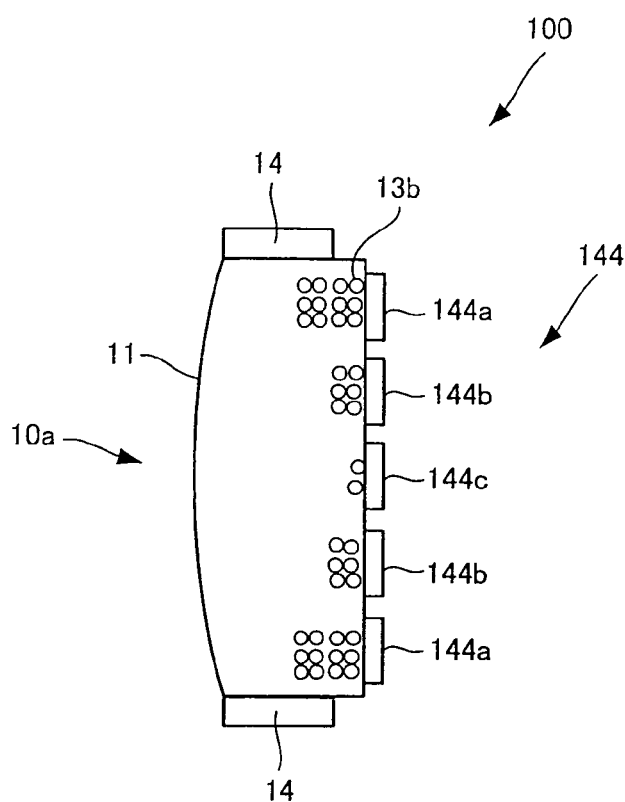
FIG. 17 is a diagram showing an example of control of the refractive index of a variable-focus lens using the pattern of concentric-circle electrode elements shown in part (b) of FIG. 16.

FIG. 17 is a diagram showing an example of control of the refractive index of a variable-focus lens using the pattern of concentric-circle electrode elements shown in part (b) of FIG. 16.

An anode 144 for attracting nanoparticles 13b is placed on a back surface in a light passage region 10a of a container 11 constituting a variable-focus lens 100. The anode 144 has a first concentric-circle electrode element 144a in the pattern and a second concentric-circle electrode element 144b in the pattern in order from the outer circumferential side. The anode 144 also has a circular electrode element 144c at a center. A voltage of a highest level is applied to the electrode element 144a, a voltage of a lower level is applied to the electrode element 144b, and a voltage of a lowest level is applied to the electrode element 144c.

Since the highest voltage is applied to the electrode element 144a, a larger amount of nanoparticles 13b are attracted to the electrode element 144a. Amounts of nanoparticles 13b according to the voltages applied to the electrode patterns 144b and 144c are respectively attracted to the electrode elements 144b and 144c. The distribution of nanoparticles 13b may be controlled according to the voltages applied to the electrode elements 144a, 144b and 144c of the anode 144 in the electrode pattern as described above.

In the pattern of electrode elements 141a in stripe form shown in part (a) of FIG. 16, lower to higher voltages may be applied to the electrode elements 141a in correspondence with the uppermost to lowermost positions to realize a variable-focus lens having a prism effect. Also, in the pattern of electrode elements 143a in matrix form shown in part (c) of FIG. 16, voltages selected as desired may be applied to the electrode elements 143a to realize a variable-focus lens for correcting ordinary lens aberrations.

Figure 18:
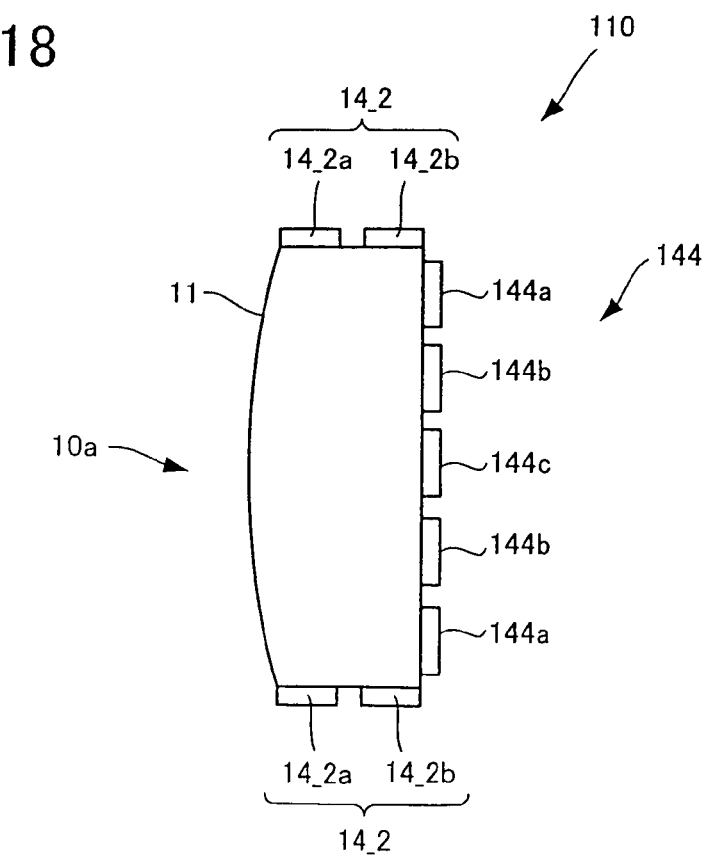
FIG. 18 is a diagram showing an example of placement of a cathode having two electrode element patterns in such positions on a container constituting a variable-focus lens as to surround a light passage region.

FIG. 18 is a diagram showing an example of placement of a cathode having two electrode element patterns in such positions on a container constituting a variable-focus lens as to surround a light passage region.

Referring to FIG. 18, a cathode 14_2 has two electrode elements 14_2a and 14_2b placed in such positions as to surround a light passage region 10a of a container 11 constituting a variable-focus lens 110. The distribution of nanoparticles 13b may be freely controlled by applying desired voltages to the electrode elements 14_2a and 14_2b of the cathode 14_2 and applying desired voltages to electrode elements 144a, 144b and 144c of an anode 144.

The electrophoretic optical elements having lens shapes have been described. Description will now be made of electrophoretic optical elements having flat shapes. The same portions of the optical elements described below as those of the above-described optical elements having lens shapes are indicated by the same reference characters, and description will be made only of points of difference.

Figure 19:
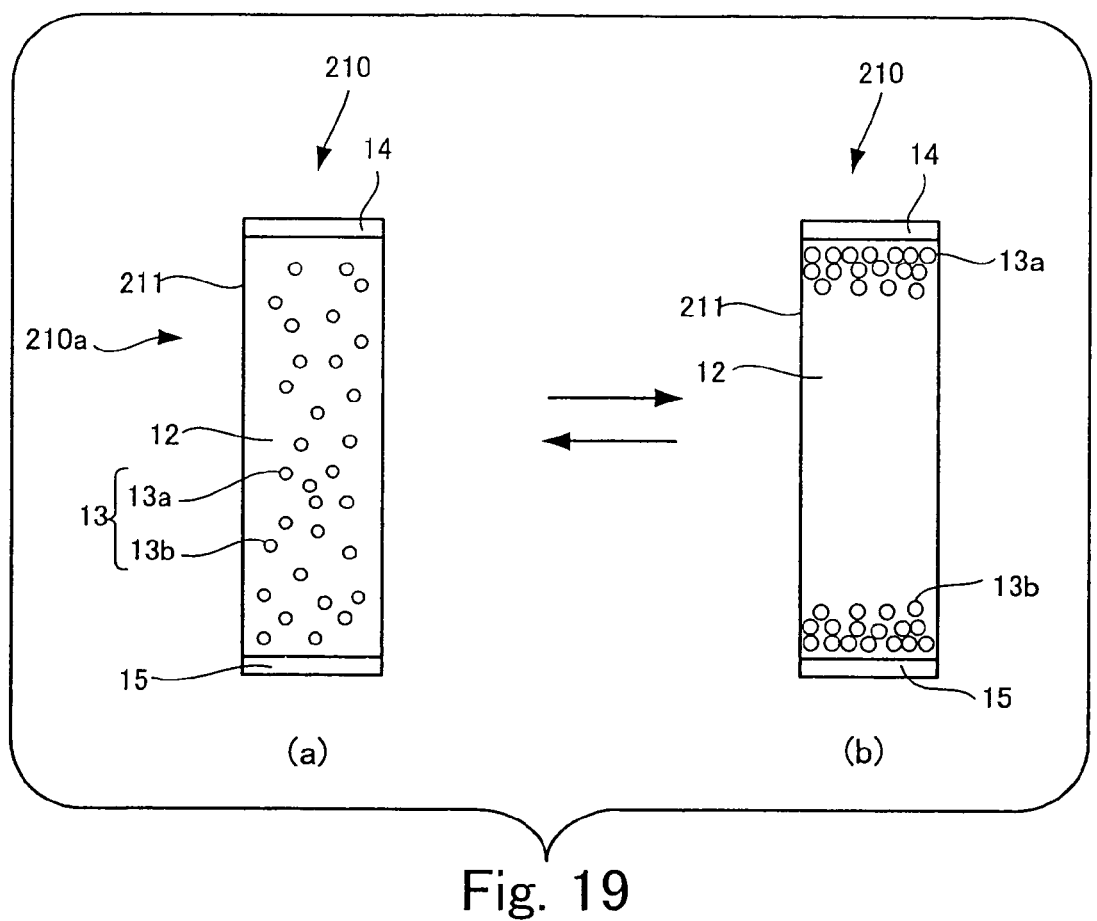
FIG. 19 is a diagram showing a sectional configuration of a variable-refractive-index plate which is a tenth embodiment of the optical element of the present invention.

FIG. 19 is a diagram showing a sectional configuration of a variable-refractive-index plate 210 which is a tenth embodiment of the optical element of the present invention.

The variable-refractive-index plate 210 shown in FIG. 19 has a container 211 which is light-transmissive at least in a light passage region 210a, and which has the shape of a flat plate as its external shape. The container 211 has a light-transmissive dispersion medium 12 and a dispersoid 13 (nanoparticles 13a positively charged and nanoparticles 13b negatively charged) enclosed therein, as does the container of the variable-focus lens 10 shown in FIG. 1.

Also, a cathode 14 which is a negative electrode for attracting the dispersoid 13 and an anode 15 which is a positive electrode for attracting the dispersoid 13 are placed in such positions on the container 11 as to surround the light passage region 10a, as are those in the variable-focus lens 10 shown in FIG. 1.

When no voltage is applied between the cathode 14 and the anode 15, the dispersoid 13 is uniformly dispersed in the dispersion medium 12, as shown in part (a) of FIG. 19. The variable-refractive-index plate 210 in this state has a comparatively high refractive index resulting from the refractive index of the dispersion medium 12 and a refractive index determined by the amount (the number of particles) of dispersoid 13 uniformly dispersed in the dispersion medium 12.

When a predetermined voltage is applied between the cathode 14 and the anode 15, the positively charged nanoparticles 13a are attracted to the cathode 14 and the negatively charged nanoparticles 13b are attracted to the anode 15, as shown in part (b) of FIG. 19. The variable-refractive-index plate 210 therefore has a comparatively low refractive index determined by the refractive index of the dispersion medium 12 only. When the application of the voltage between the cathode 14 and the anode 15 is stopped, the variable-refractive-index plate 210 is again settled in the state shown in part (a) of FIG. 19.

Figure 20:
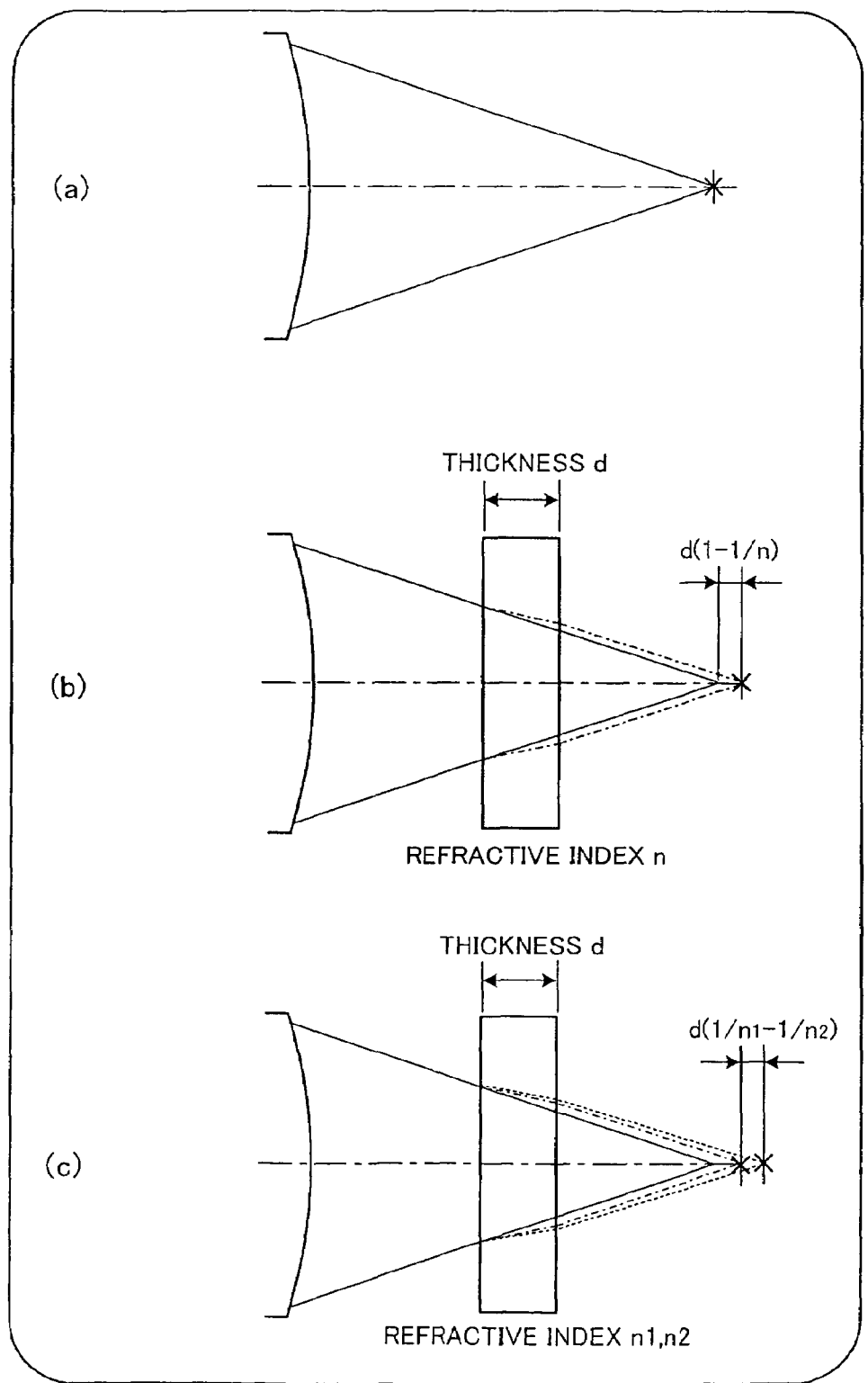
FIG. 20 is a diagram for explaining shifting of an imaging point in the variable-refractive-index plate.

FIG. 20 is a diagram for explaining shifting of an imaging point in the variable-refractive-index plate 210.

An imaging point at which an image is formed by subject light from a convex lens is shown in part (a) of FIG. 20. A variable-refractive-index plate having a thickness d and a refractive index n is inserted in the image space, as shown in part (b) of FIG. 20. The equivalent air length of the variable-refractive-index plate is expressed as a value (d/n) obtained by dividing the thickness d by the refractive index n. Consequently, the imaging point is shifted rearward (to the left as viewed in FIG. 20) by $d(1-1/n)$.

As shown in part (c) of FIG. 20 in a case where two refractive-index-changing plates having the same thickness d and having different refractive indices (n1 and n2) are provided and selectively inserted in the image space, the difference $\Delta d$ between the imaging points determined by the refractive-index-changing plates is $d(1/n1-1/n2)$. Since the distance of the imaging point from the rear focus in a lens system having a focal length f when the object distance is D is $f^2/D$, focusing to an infinite-distance object and an object at the distance shown by $f^2/D$ can be performed by inserting and removing the refractive-index-changing plates. Adjustment of the focal length for this focusing can be performed by controlling the refraction of light through electrophoresis of the dispersoid 13 using the variable-refractive-index plate 210 shown in FIG. 19 instead of inserting and removing the two refractive-index-changing plates.

An embodiment of the variable-refractive-index plate 210 shown in FIG. 19 will be described.

Nanoparticles of titanium oxide were used as dispersoid 13 in the embodiment of the variable-refractive-index plate 210. The titanium oxide nanoparticles were prepared by a method described below. Hydrous titanium oxide was made formless by an alkali, thereafter aged in hydrochloric acid, and formed into particles having a particle size of 10 nm by a heat treatment. The surfaces of the particles were processed by using a titanium coupling agent (isopropyl triisostearoyl titanate) solution. An optical element was made as the variable-refractive-index plate 210 by dispersing the thus-obtained titanium oxide nanoparticles in ISOPAR (a product from Exxon Corporation).

When about 20% by volume of the titanium oxide nanoparticles (having a refractive index of 2.30) were mixed in ISOPAR (having a refractive index of 1.48), the refractive index changed from 1.48 to 1.644. In the case of mixing of about 30% by volume, the refractive index changed from 1.48 to 1.726.

In a case where a plane-parallel plate having a thickness of 1.0 mm is made by using this variable-refractive-index plate, a change in refractive index converted into an optical path difference when 20% of titanium oxide nanoparticles are mixed is 0.0674. Also, a change in refractive index converted into an optical path difference when 30% of titanium oxide nanoparticles are mixed is 0.0963. In a case where the plane-parallel plate containing 20% of titanium oxide nanoparticles is used for focusing, an image taking lens with a focal length of 7 mm, which is focused to the infinity by increasing the refractive index, can be focused to 73 cm by reducing the refractive index. In a case where the plane-parallel plate containing 30% of titanium oxide nanoparticles is used, the image taking lens can be focused to 51 cm by reducing the refractive index.

Figure 21:
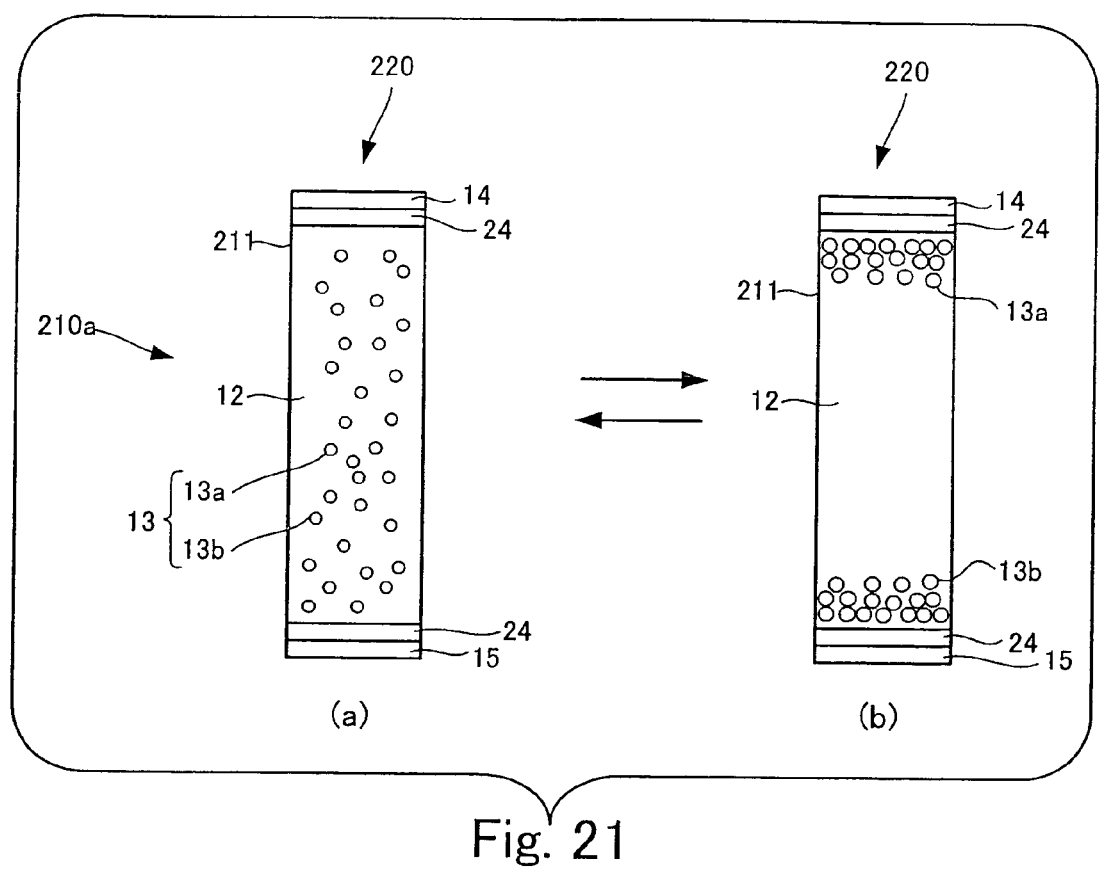
FIG. 21 is a diagram showing a sectional configuration of a variable-refractive-index plate which is an eleventh embodiment of the optical element of the present invention.

FIG. 21 is a diagram showing a sectional configuration of a variable-refractive-index plate 220 which is an eleventh embodiment of the optical element of the present invention.

The variable-refractive-index plate 220 shown in FIG. 21 differs from the variable-refractive-index plate 210 shown in FIG. 19 in that each of the inner surfaces of the cathode 14 and the anode 15 is coated with insulating film 24 which is placed adjacent to the dispersion medium 12. In this variable-refractive-index plate 220, the insulating film 24 provided as a coating on the inner surfaces of the cathode 14 and the anode 15 prevents agglomeration of the dispersoid 13 on the cathode 14 and the anode 15. The insulating film 24 is a polyimide insulating film. Therefore, the cathode 14 and the anode 15 have excellent heat resistance and durability. In the variable-refractive-index plate 220 thus constructed, the refraction of light passing through the light passage region 10a may be controlled through electrophoresis of the dispersoid 13.

Figure 22:
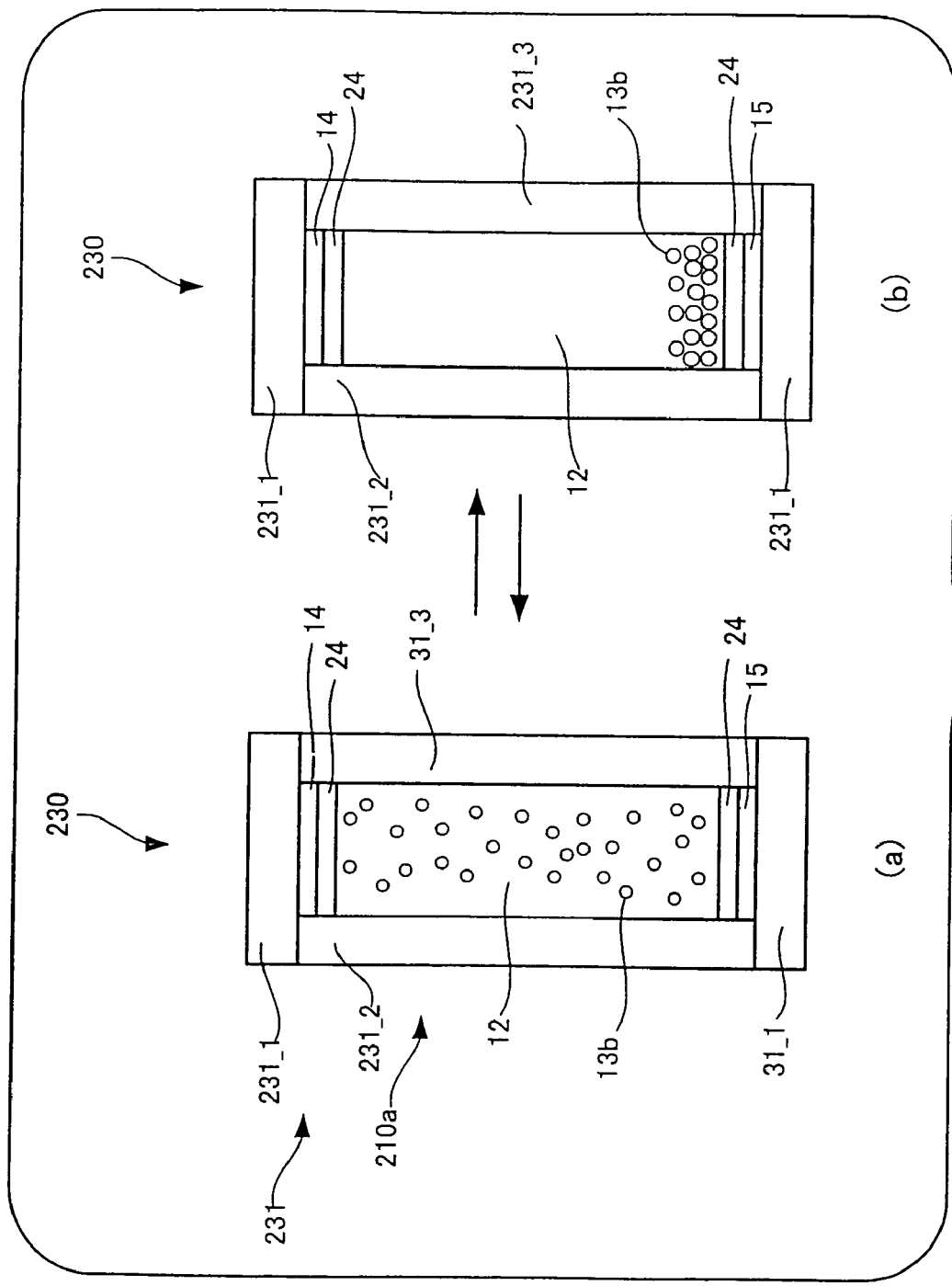
FIG. 22 is a diagram showing a sectional configuration of a variable-refractive-index plate which is a twelfth embodiment of the optical element of the present invention.

FIG. 22 is a diagram showing a sectional configuration of a variable-refractive-index plate 230 which is a twelfth embodiment of the optical element of the present invention.

The variable-refractive-index plate 230 shown in FIG. 22 has a container 231 formed by a cylindrical member 231_1 placed so as to surround a cathode 14 and an anode 15 and members 231_2 and 231_3 fitted in front and rear surfaces of the member 231_1, light transmissive at least in a light passage region 210a and each having the shape of a disk as its external shape. These members 231_1, 231_2, and 231_3 are formed of a plastic. Therefore, the container 231 can be realized as a lightweight container having high impact resistance. These members 231_1, 231_2, and 231_3 may be formed of glass instead of being formed of a plastic.

Nanoparticles 13b negatively charged are dispersed in a dispersion medium 12, as shown in part (a) of FIG. 22. When a predetermined voltage is applied between the cathode 14 and the anode 15, the nanoparticles 13b uniformly dispersed in the dispersion medium 12 are attracted to the anode 15, as shown in part (b) of FIG. 22. The refractive index of the variable-refractive-index plate 230 is thereby changed from a comparatively high value determined by the refractive index of the dispersion medium 12 and the nanoparticles 13b to a comparatively low value determined by the refractive index of the dispersion medium 12 only.

Figure 23:
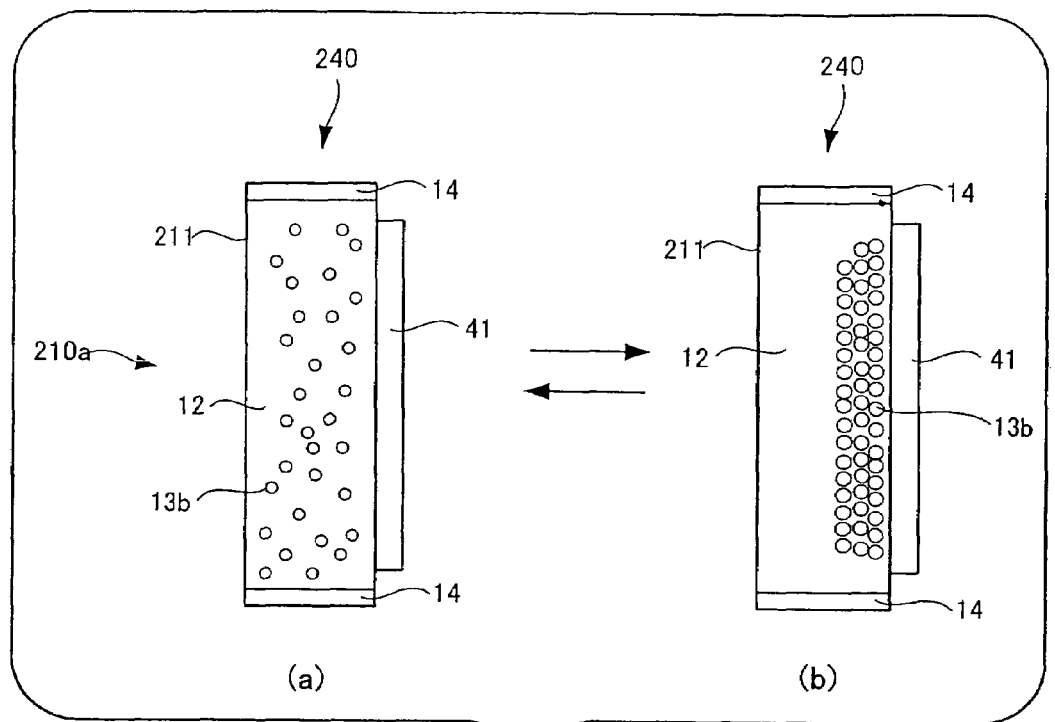
FIG. 23 is a diagram showing a sectional configuration of a variable-refractive-index plate which is a thirteenth embodiment of the optical element of the present invention.

FIG. 23 is a diagram showing a sectional configuration of a variable-refractive-index plate 240 which is a thirteenth embodiment of the optical element of the present invention.

The variable-refractive-index plate 240 shown in FIG. 23 has negatively charged nanoparticles 13b dispersed in a dispersion medium 12. The variable-refractive-index plate 240 has a cathode 14 placed in such a position on a container 211 as to surround a light passage region 210a. The variable-refractive-index plate 240 also has an anode 41 for attracting the nanoparticles 13b. The anode 41 is placed on a back surface of the container 11 in the light passage region 210a.

When no voltage is applied between the cathode 14 and the anode 41, the nanoparticles 13b are uniformly dispersed in the dispersion medium 12, as shown in part (a) of FIG. 23. When a predetermined voltage is applied between the cathode 14 and the anode 41, the nanoparticles 13b uniformly dispersed in the dispersion medium 12 are uniformly attracted to the anode 41, as shown in part (b) of FIG. 23. While attraction of nanoparticles 13b to the anode 41 placed on the back surface of the container 11 has been described with respect to the case of uniformly attracting nanoparticles 13b to the anode 41, it is possible to variously change the distribution of nanoparticles 13b attracted to the anode 41, for example, by using an arrangement in which the anode 41 is formed of electrode elements in a concentric-circle pattern and by devising a method of applying voltages to the electrode elements. Variable-refractive-index plates 240 having different refractive indices can therefore be realized.

Figure 24:
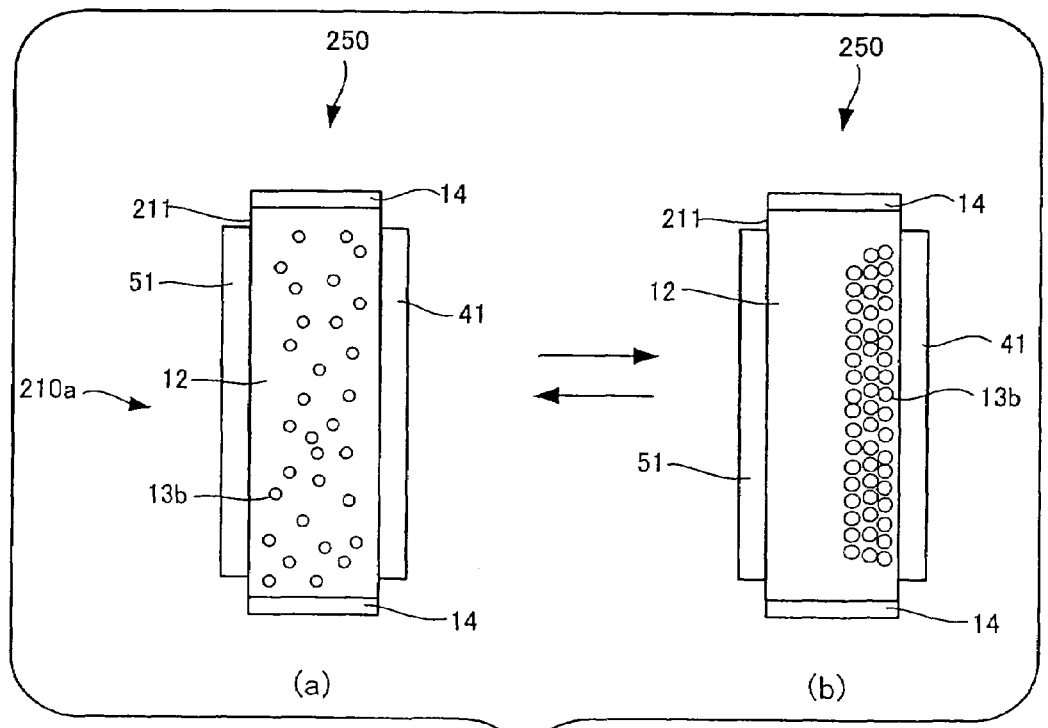
FIG. 24 is a diagram showing a sectional configuration of a variable-refractive-index plate which is a fourteenth embodiment of the optical element of the present invention.

FIG. 24 is a diagram showing a sectional configuration of a variable-refractive-index plate 250 which is a fourteenth embodiment of the optical element of the present invention.

The variable-refractive-index plate 250 shown in FIG. 24 differs from the variable-refractive-index plate 240 shown in FIG. 23 in that a cathode 51 is placed on the front surface of a container 211. In this variable-refractive-index plate 250, negative nanoparticles 13b are attracted to the anode 41 while receiving a repulsion force from an electric field generated from the cathode 51 and can therefore be rapidly attracted to the anode 41.

Figure 25:
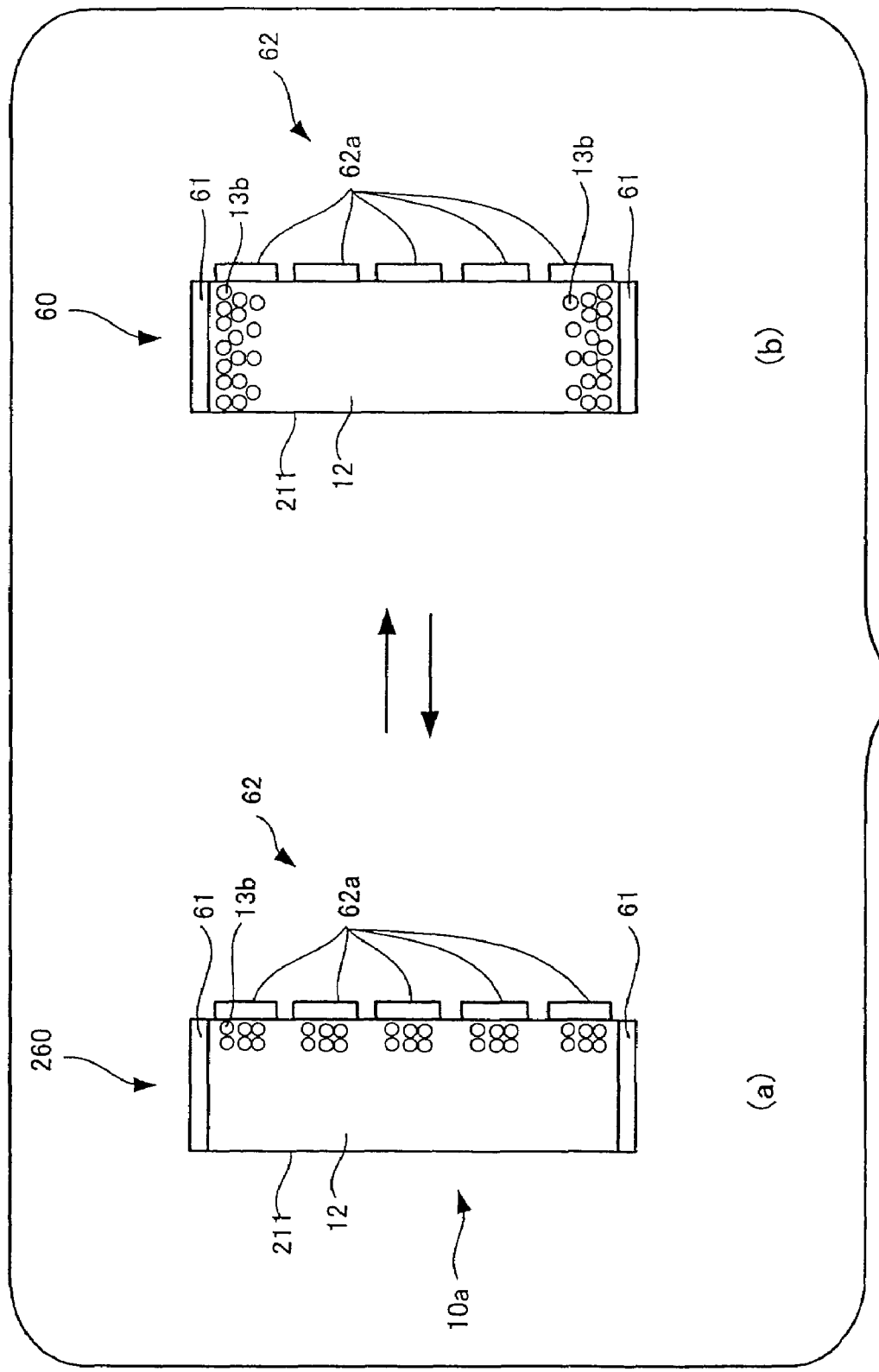
FIG. 25 is a diagram showing a sectional configuration of a variable-refractive-index plate which is a fifteenth embodiment of the optical element of the present invention.

FIG. 25 is a diagram showing a sectional configuration of a variable-refractive-index plate 260 which is a fifteenth embodiment of the optical element of the present invention.

A first electrode 61 is placed in such a position on a container 211 constituting the variable-refractive-index plate 260 as to surround a light passage region 210a. Also, a second electrode 62 constituted of a certain number of electrode elements 62a is placed on a back surface of the container 211 in the light passage region 210a. Further, negative nanoparticles 13b are dispersed in a dispersion medium 12.

If a negative voltage and a positive voltage are respectively applied to the first and second electrodes 61 and 62, the first and second electrodes 61 and 62 function as a cathode and an anode, respectively. If a positive voltage and a negative voltage are respectively applied to the first and second electrodes 61 and 62, the first and second electrodes 61 and 62 function as an anode and a cathode, respectively.

It is assumed here that a negative voltage and a positive voltage are respectively applied to the first and second electrodes 61 and 62 in the reactive-index-variable plate 260 shown in part (a) of FIG. 25, the first and second electrodes 61 and 62 function as a cathode and an anode, respectively. It is also assumed that the values of the voltages applied to the plural electrode elements 62a constituting the second electrode 62 are equal to each other. Accordingly, in this case, equal amounts of nanoparticles 13b are attracted to the plural electrode elements 62a.

Subsequently, a positive voltage and a negative voltage are applied respectively to the first and second electrodes 61 and 62, as shown in part (b) of FIG. 25. The first and second electrodes 61 and 62 then function as an anode and a cathode, respectively, and nanoparticles 13b are attracted to the first electrode 61. The distribution of nanoparticles 13b may be controlled in this way.

Figure 26:
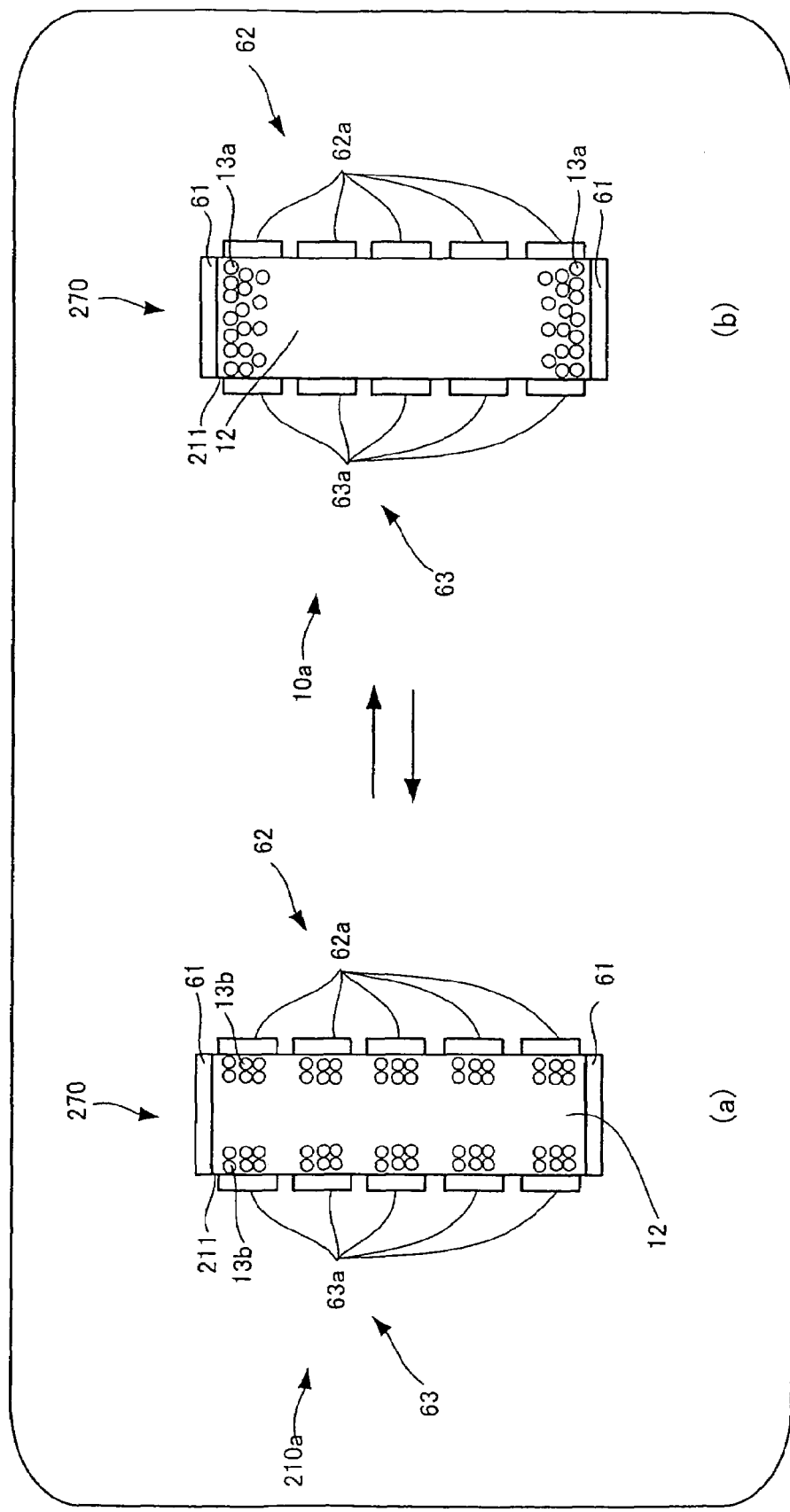
FIG. 26 is a diagram showing a sectional configuration of a variable-refractive-index plate which is a sixteenth embodiment of the optical element of the present invention.

FIG. 26 is a diagram showing a sectional configuration of a variable-refractive-index plate 270 which is a sixteenth embodiment of the optical element of the present invention.

The variable-refractive-index plate 270 shown in FIG. 26 differs from the variable-refractive-index plate 260 shown in FIG. 25 in that a third electrode 63 formed of plural electrode elements 63a which perform the same function as that of the second electrode 62 is also placed on the front surface of the container 211 in the light passage region 210a.

Referring to part (a) of FIG. 26, if voltages applied to the first to third electrodes 61 to 63 are such that the voltage applied to the first electrode 61 is negative while the voltages applied to the second and third electrodes 62 and 63 are positive, the first electrode 61 functions as a cathode and the second and third electrodes 62 and 63 function as an anode, so that equal amounts of nanoparticles 13b are respectively attracted to the plural electrode elements 62a and 63a.

Subsequently, a positive voltage is applied to the first electrode 61 and a negative voltage is applied to the second and third electrodes 62 and 63, as shown in part (b) of FIG. 26. Then, the first electrode 61 functions as an anode and the second and third electrodes 62 and 63 function as a cathode, so that the nanoparticles 13b are attracted to the first electrode 61. The distribution of nanoparticles 13b may be controlled in this way.

Figure 27:
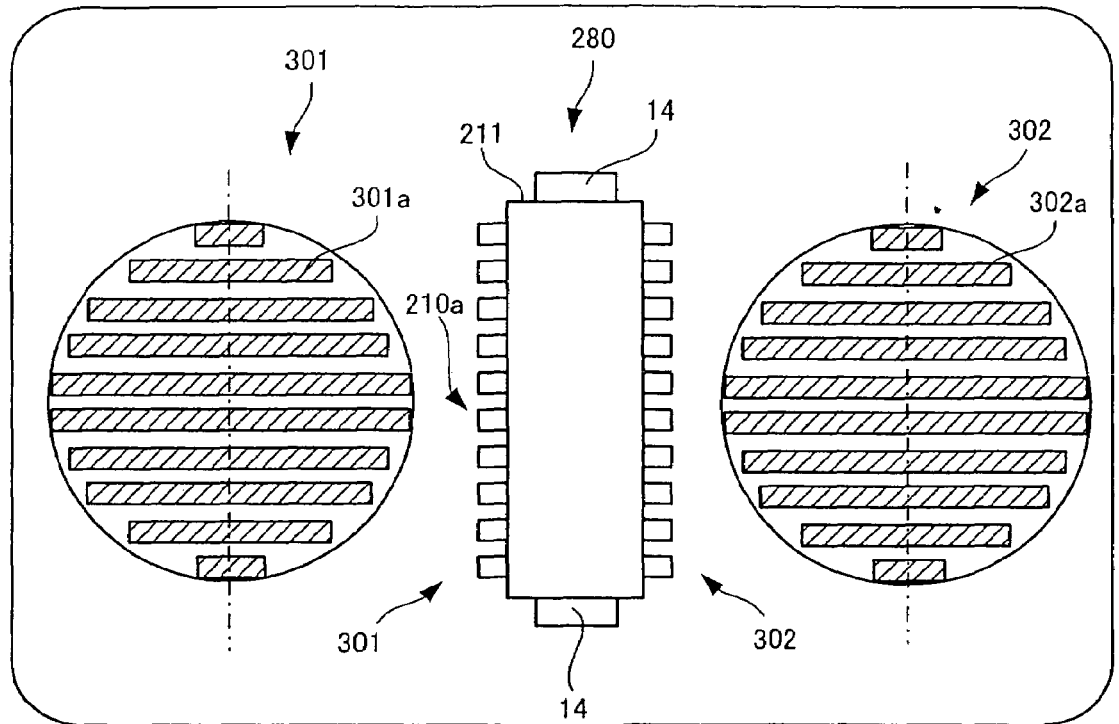
FIG. 27 is a diagram showing a sectional configuration of a variable-refractive-index plate which is a seventeenth embodiment of the optical element of the present invention.

FIG. 27 is a diagram showing a sectional configuration of a variable-refractive-index plate 280 which is a seventeenth embodiment of the optical element of the present invention.

In the variable-refractive-index plate 280 shown in FIG. 27, a cathode 14 is placed in such a position on a container 211 as to surround a light passage region 210a. In the variable-refractive-index plate 280, an anode 301 having a pattern of electrode elements 301a in the form of horizontal stripes is placed on a front surface of the container 211 in the light passage region 210a. Further, in the variable-refractive-index plate 280, an anode 302 having a pattern of electrode elements 302a in the form of horizontal stripes is placed on a back surface of the container 211 in the light passage region 210a. Since the electrode patterns 301a and 302a of the anodes 301 and 302 are symmetrical, this variable-refractive-index plate 280 is capable of rapidly controlling the refractive index, for example, by applying voltages such that the voltage value is gradually reduced (or increased) from the top to the bottom of the electrode patterns 301a and 302a. A prism effect can be rapidly produced in this way. The thus-constructed variable-refractive-index plate 280 may be provided in a camera together with an acceleration sensor for camera shake correction to perform vertical camera shake correction of a lens provided in the camera according to a signal from the acceleration sensor. Also, the thus-constructed variable-refractive-index plate 280 may be provided in a view finder of a camera to make parallax correction.

Figure 28:
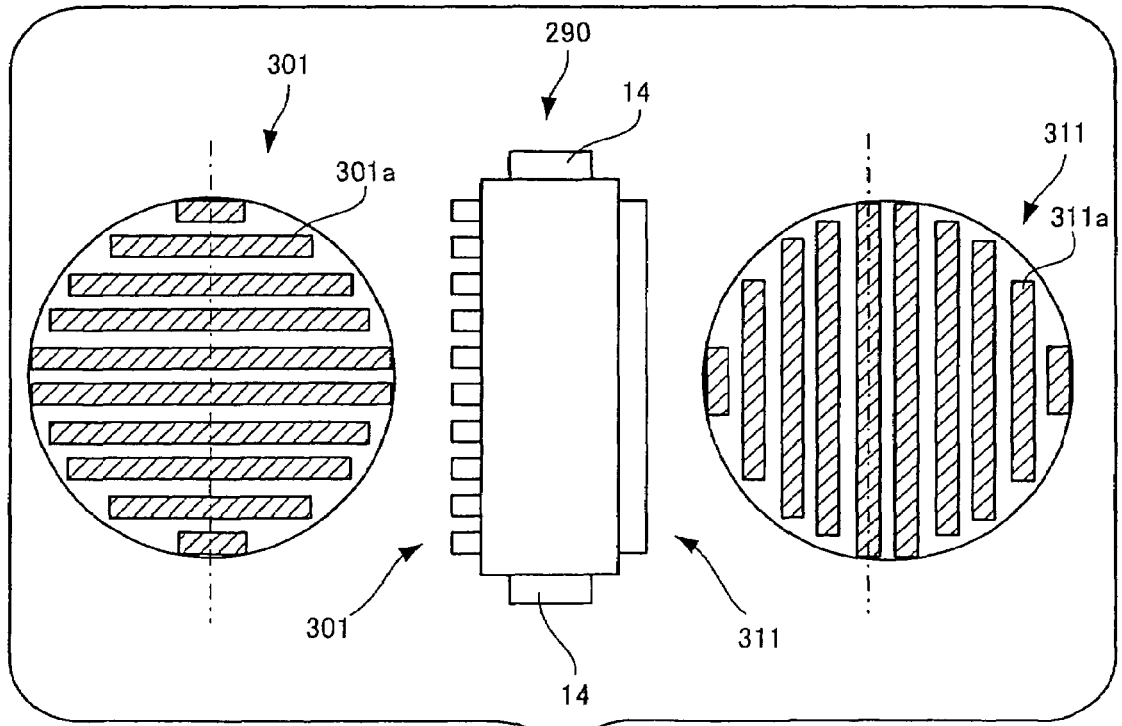
FIG. 28 is a diagram showing a sectional configuration of a variable-refractive-index plate which is an eighteenth embodiment of the optical element of the present invention.

FIG. 28 is a diagram showing a sectional configuration of a variable-refractive-index plate 290 which is an eighteenth embodiment of the optical element of the present invention.

The variable-refractive-index plate 290 shown in FIG. 28 differs from the variable-refractive-index plate 280 shown in FIG. 27 in that an anode 311 having a pattern of electrode elements 311a in the form of vertical stripes is provided in place of the anode 302 having the pattern of electrode elements 302a in the form of horizontal stripes. Camera shake correction and parallax correction along the vertical and horizontal directions of a lens may be performed by controlling the refractive index in the vertical direction by means of the electrode pattern 301a and controlling the refractive index in the horizontal direction by means of the electrode pattern 311a.

Figure 29:
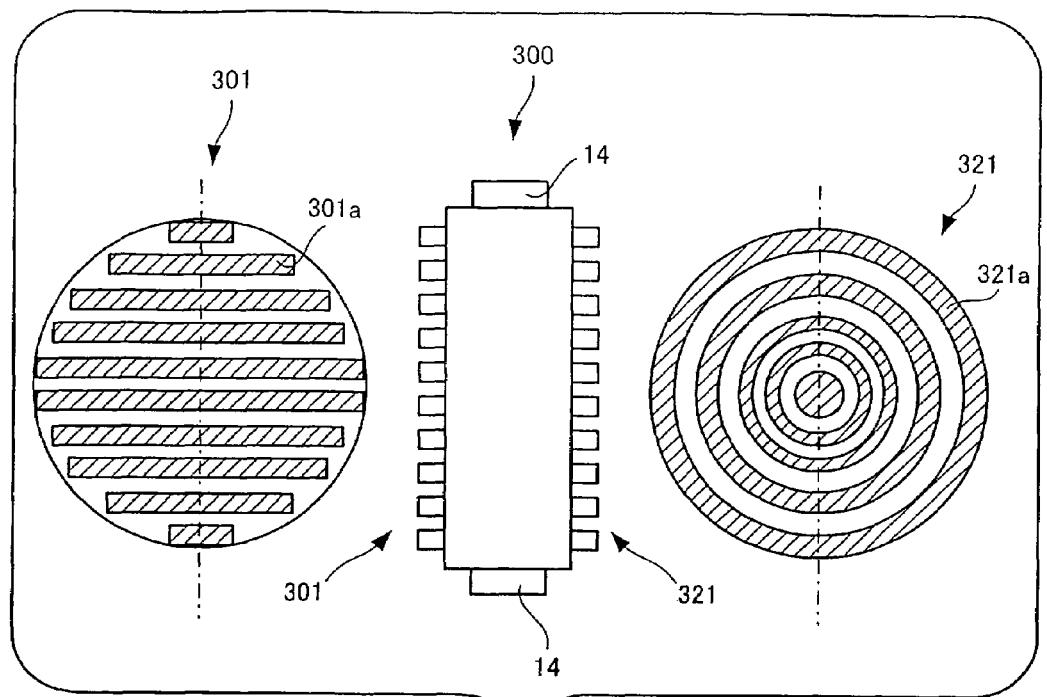
FIG. 29 is a diagram showing a sectional configuration of a variable-refractive-index plate which is a nineteenth embodiment of the optical element of the present invention.

FIG. 29 is a diagram showing a sectional configuration of a variable-refractive-index plate 300 which is a nineteenth embodiment of the optical element of the present invention.

The variable-refractive-index plate 300 shown in FIG. 29 differs from the variable-refractive-index plate 290 shown in FIG. 28 in that an anode 321 having a pattern of concentric-circle electrode elements 321a is provided in place of the anode 311 having a pattern of electrode elements 311a in the form of vertical stripes. An image taking lens using one variable-refractive-index plate 300 for camera shake correction and for focusing may be implemented by realizing a convex lens by means of the electrode pattern 321a and by realizing a prism effect by means of the electrode pattern 301a. Also, this variable-refractive-index plate 300 may be used in a view finder optical system of a camera having a zoom lens to realize a zoom finder capable of changing according to the field of view changed by the zoom lens.

Figure 30:
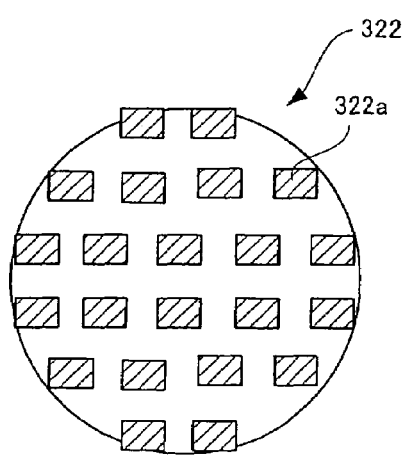
FIG. 30 is a diagram showing an anode having a pattern of electrode elements in matrix form.

FIG. 30 is a diagram showing an anode having a pattern of electrode elements in matrix form.

An anode 322 shown in FIG. 30 has a pattern of electrode elements 322a in matrix form. A variable-refractive-index plate having the anode 322 may be placed adjacent to an ordinary lens, and an aberration of the lens may be corrected as described below. An aberration correction table formed of data for correcting an aberration of the lens is prepared and the distribution of nanoparticles is controlled by applying the voltage to the electrode elements 322a in matrix form according to the data in the aberration correction table. The refractive index of the variable-refractive-index plate is thereby controlled so that the aberration of the lens is corrected.

The electrophoretic optical elements flat shapes have been described. The shape of the optical element in accordance with the present invention is not limited to the above-described lens shape and flat shape. For example, an optical element having the shape of a prism may be formed. An electrophoretic optical element having the shape of a prism will be described. The same portions of the optical elements described below as those of the above-described optical elements having lens shapes and flat shapes are indicated by the same reference characters, and description will be made only of points of difference.

Figure 31:
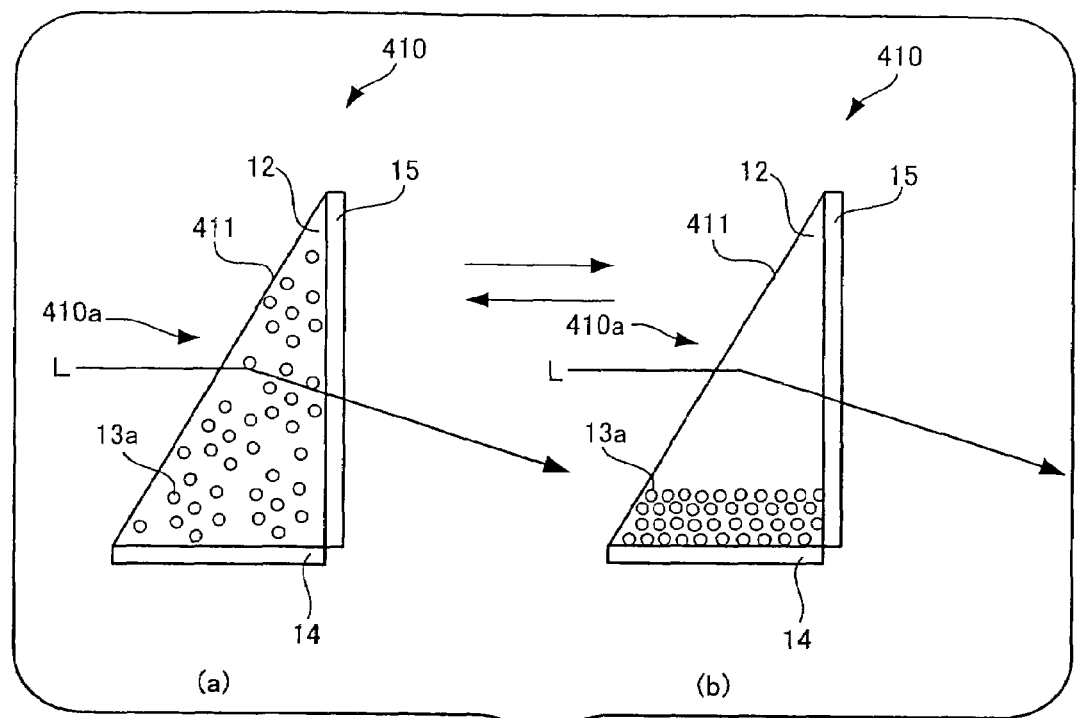
FIG. 31 is a diagram showing a variable-refractive-index prism which is a twentieth embodiment of the optical element of the present invention.

FIG. 31 is a diagram showing a variable-refractive-index prism 410 which is a twentieth embodiment of the optical element of the present invention.

The prism 410 shown in FIG. 31 has substantially the same construction of the variable-focus lens 10 shown in FIG. 1 and the variable-refractive-index plate 210 shown in FIG. 19. However, a container 411 of the prism 410 has the shape of a prism as its external shape; a cathode 14 is provided in such a position of the container 411 as not to interfere with passage of light through a light passage region 410a; and an anode 15 is provided on a back surface in the light passage region 410a. No nanoparticles 13b negatively charged are contained in the prism 410. Only nanoparticles 13a positively charged are contained in the prism 410.

When no voltage is applied between the cathode 14 and the anode 15, the positive nanoparticles 13a are uniformly dispersed in a dispersion medium 12, as shown in part (a) of FIG. 31. At this time, the prism 410 has a refractive index according to the dispersion medium 12 and the amount of positive nanoparticles 13a existing in the light passage region 410a, such that light L which enters the prism 410 is refracted comparatively largely.

When a predetermined voltage is applied between the cathode 14 and the anode 15, the positive nanoparticles 13a uniformly dispersed in the dispersion medium 12 are attracted to the cathode 14, as shown part (b) of FIG. 31. The refractive index of the prism 410 is thereby changed to a value determined by the refractive index of the dispersion medium 12 only. The refractive index in this state is lower than that in the state shown in part (a) of FIG. 31, and light L entering the prism 410 is refracted through a small angle.

Figure 32:
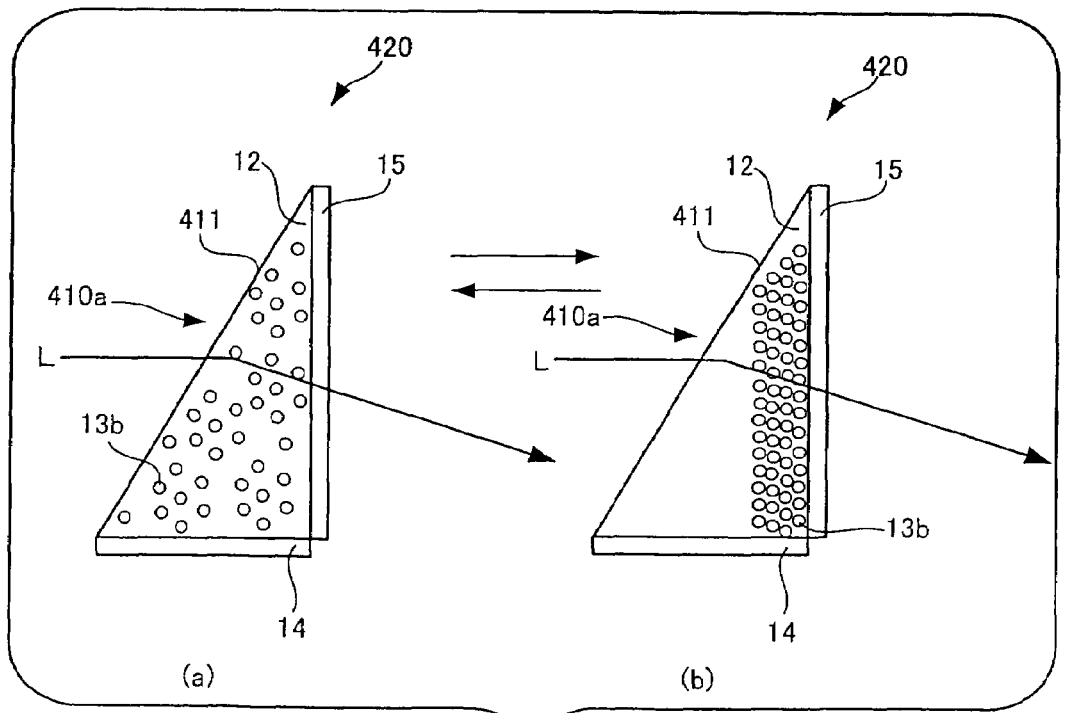
FIG. 32 is a diagram showing a variable-refractive-index prism which is a twenty-first embodiment of the optical element of the present invention.

FIG. 32 is a diagram showing a variable-refractive-index prism 520 which is a twenty-first embodiment of the optical element of the present invention.

The prism 520 shown in FIG. 32 has the same construction as that of the prism 410 shown in FIG. 31 but it has negatively charged nanoparticles 13b in place of positively charged nanoparticles 13a.

When a predetermined voltage is applied between the cathode 14 and the anode 15, the negative nanoparticles 13b uniformly dispersed in the dispersion medium 12 are attracted to the anode 15, as shown part (b) of FIG. 32. The refractive index of the prism 520 is thereby increased to largely refract light L entering the prism 520.

Thus, it is possible to control the refraction of light by using an optical member having the shape of a prism. Various arrangements relating to electrode placement and insulating film such as those in the above-described optical elements having lens shapes and flat shapes can also be applied to the prisms 410 and 420 shown in FIGS. 31 and 32.

Electrophoretic optical elements in which the refraction of light is controlled through electrophoresis of a dispersoid dispersed in a dispersion medium have been described. Magnetophoretic optical elements in which refraction of light is controlled by effecting magnetophoresis of a magnetic dispersoid dispersed in a dispersion medium will now be described.

Figure 33:
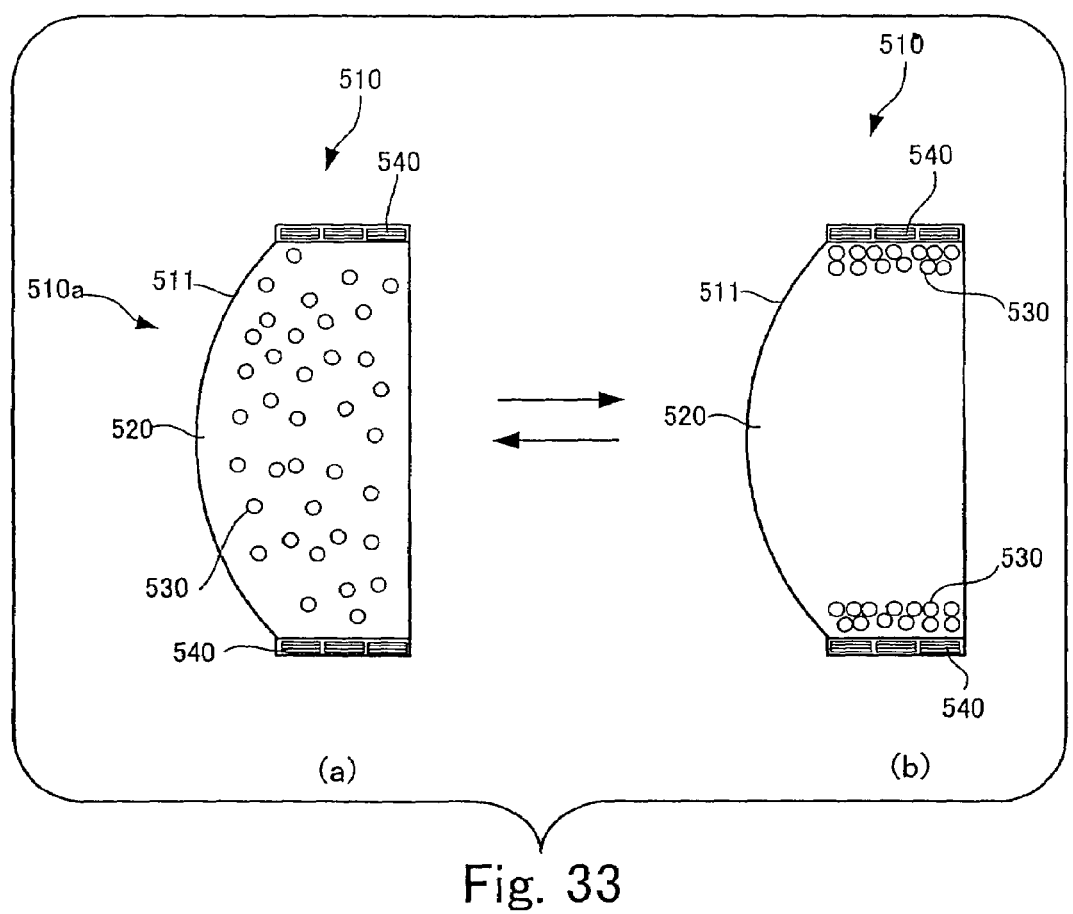
FIG. 33 is a diagram showing a variable-focus lens which is a twenty-second embodiment of the optical element of the present invention, and in which the refraction of light is controlled by effecting magnetophoresis of a dispersoid.

FIG. 33 is a diagram showing a variable-focus lens 510 which is a twenty-second embodiment of the optical element of the present invention, and in which the diffraction of light is controlled by effecting magnetophoresis of a dispersoid.

The variable-focus lens 510 shown in FIG. 33 has the shape of a lens, as does the container 11 of the variable-focus lens 10 shown in FIG. 1, and has a transparent dispersion medium 520 and a transparent magnetic nanoparticles 530 which is light-transmissive at least in a light passage region 510a, which are enclosed in a container 511. As the dispersion medium 520, the same fluid as that dispersion medium 12 in the variable-focus lens 10 shown in FIG. 1 can be used. As the material of the transparent magnetic nanoparticles 530, titanium-cobalt dioxide or the like can be used.

In the variable-focus lens 510, coils 540 for generating magnetic fields for causing magnetophoresis of magnetic nanoparticles 530 are provided in place of the electrodes (cathode 14 and anode 15) of the variable-focus lens 10 shown in FIG. 1. The coils 540 are an example of the electromagnetic field generator in accordance with the present invention and correspond to the magnetic field generator in accordance with the present invention.

Figure 34:
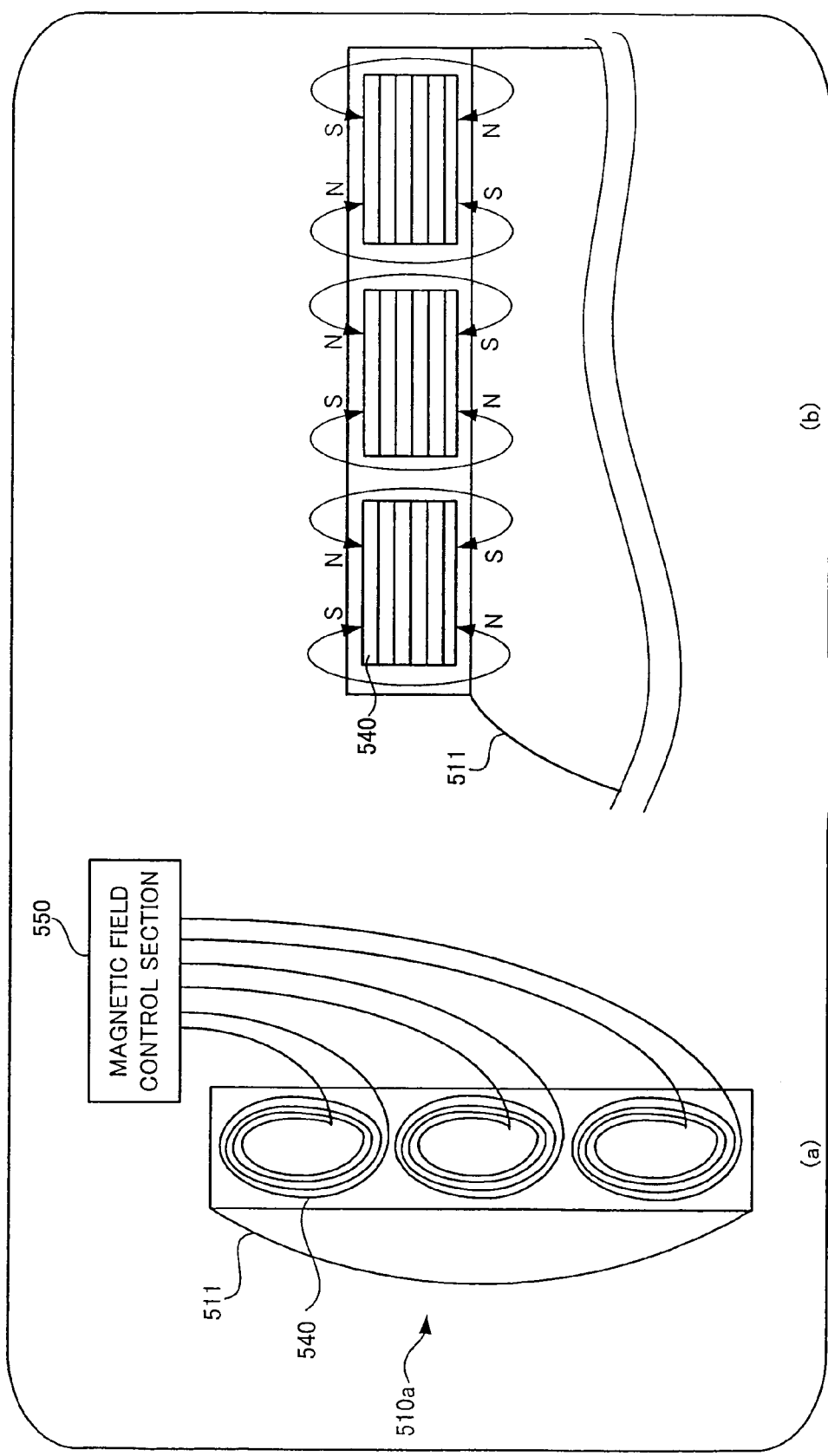
FIG. 34 is a diagram schematically showing the construction of the variable-focus lens shown in FIG. 33.

FIG. 34 is a diagram schematically showing the construction of the variable-focus lens 510 shown in FIG. 33.

Part (a) of FIG. 34 shows a top view of the variable-focus lens 510.

Three wound coils 540 are placed side by side on upper and lower surfaces of the container 511. A magnetic field control section 550 for controlling magnetic fields generated from the coils 540 by causing currents to flow through the coils 540 are connected to the coils 540.

Part (b) of FIG. 34 shows an enlarged view of a portion of the variable-focus lens 510 in the vicinity of the coils 540.

For example, the magnetic field control section 550 shown in part (a) of FIG. 34 supplies currents to the three coils 540 in directions corresponding to each other. Magnetic fields are thereby generated through the three coils 540. That is, magnetic fields in which north and south poles are alternately arranged are applied to the container 511, as shown in part (b) of FIG. 34. The polarity of each of the magnetic fields applied from the coils 540 to the container 511 for magnetophoresis of magnetic nanoparticles 530 may be either of the north pole and the south pole. Also, the directions of the currents supplied to the three coils 540 may be different from each other.

The magnitudes of the magnetic fields applied from the coils 540 to the container 511 and the regions through which the magnetic fields are applied can be accurately controlled by individually adjusting the directions and magnitudes of the currents supplied to the three coils 540.

A further description will be made by referring again to FIG. 33.

When no magnetic fields are generated by the coils 540, the magnetic nanoparticles 530 are uniformly dispersed in the dispersion medium 520, as shown in part (a) of FIG. 33.

When currents are supplied to the coils 540 by the magnetic field control section 550 shown in part (a) of FIG. 34, magnetic fields according to the directions and magnitudes of the supplied currents are generated by the coils 540. The magnetic nanoparticles 530 uniformly dispersed in the dispersion medium 520 are attracted by the magnetic forces of the coils 540 to reduce the refractive index of the variable-focus lens 510, as shown in part (b) of FIG. 33.

Thus, the refraction of light passing through the variable-focus lens 510 by effecting magnetophoresis of the dispersoid dispersed in the dispersion medium instead of electrophoresis.

Figure 35:
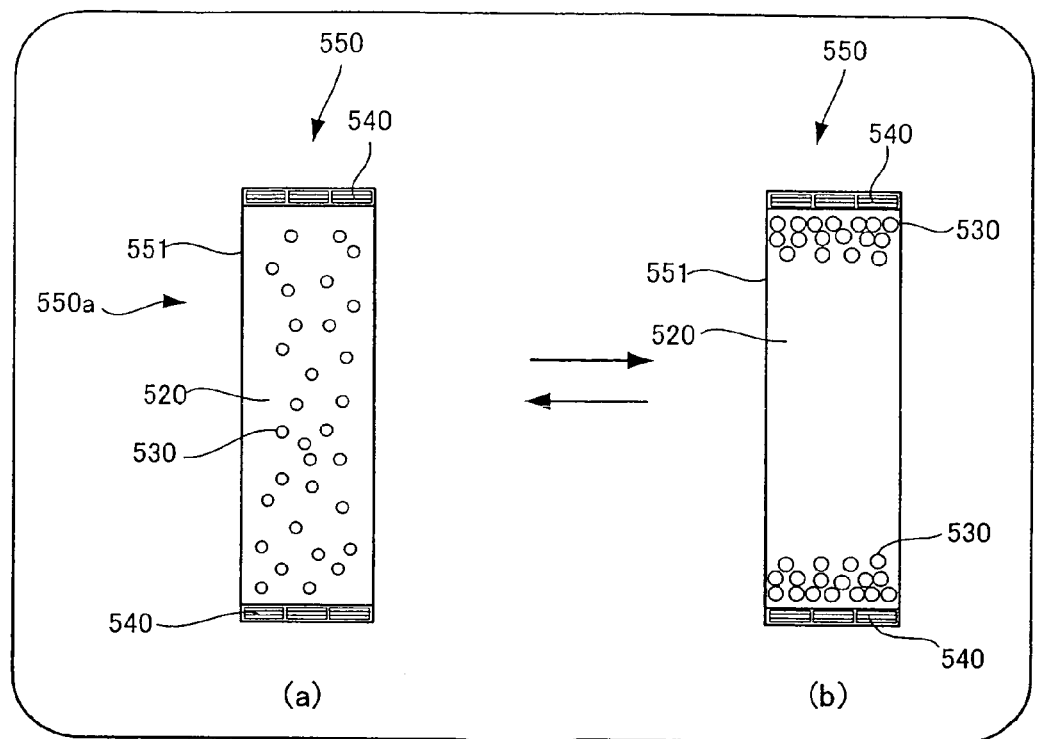
FIG. 35 is a diagram showing a magnetophoretic variable-refractive-index plate which is a twenty-third embodiment of the optical element of the present invention.

FIG. 35 is a diagram showing a magnetophoretic variable-refractive-index plate 550 which is a twenty-third embodiment of the optical element of the present invention.

The variable-refractive-index plate 550 shown in FIG. 35 has a container 551 in the form of a flat plate similar to the container 211 of the variable-refractive-index plate 210 shown in FIG. 19. The container 551 has a transparent dispersion medium 520 and a transparent nanoparticles 530 enclosed therein, as does the container of the variable focus lens 510 shown in FIG. 33.

Coils 540 for generating magnetic fields for magnetophoresis of nanoparticles 530 are placed in such a position on the container 551 as to surround a light passage region 550a, as are those in the variable-focus lens 510 shown in FIG. 33.

When no magnetic fields are generated by the coils 540, the magnetic nanoparticles 530 are uniformly dispersed in the dispersion medium 520, as shown in part (a) of FIG. 35. In this state, the variable-refractive-index plate 550 has a comparatively high refractive index resulting from the refractive index of the dispersion medium 520 and the amount (number) of nanoparticles 530 uniformly dispersed in the dispersion medium 520.

When currents are supplied to the coils 540, magnetic fields are generated by the coils 540. The magnetic nanoparticles 530 are attracted by the magnetic fields generated by the coils 540, as shown in part (b) of FIG. 35. In this state, therefore, the variable-refractive-index plate 550 has a comparatively low refractive index determined by the refractive index of the dispersion medium 520 only. When the supply of the currents to the coils 540 is stopped, the variable-refractive-index plate 550 is again settled in the state shown in part (a) of FIG. 35.

Thus, a variable-refractive-index plate capable of changing the focal length can also be formed in a magnetophoretic optical element.

Figure 36:
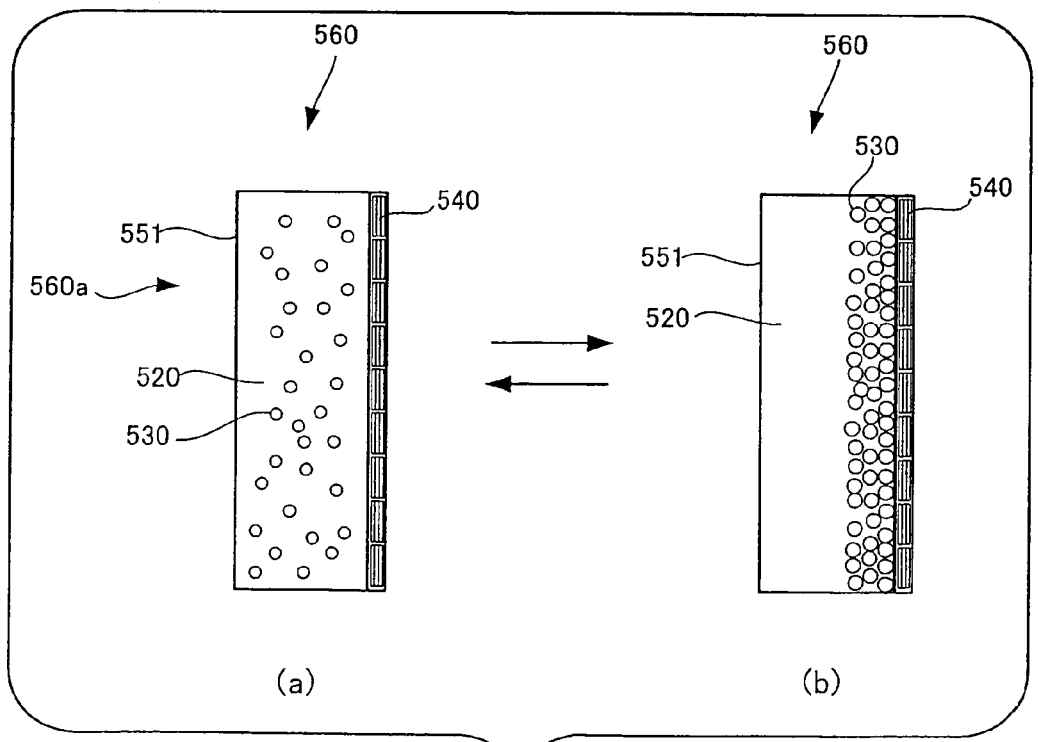
FIG. 36 is a diagram showing a magnetophoretic variable-refractive-index plate which is a twenty-fourth embodiment of the optical element of the present invention.

FIG. 36 is a diagram showing a magnetophoretic variable-refractive-index plate 560 which is a twenty-fourth embodiment of the optical element of the present invention.

The variable-refractive-index plate 560 shown in FIG. 36 has substantially the same construction as that of the variable-refractive-index plate 550 shown in FIG. 35 but differs from the variable-refractive-index plate 550 in that coils 540 are placed on a back surface in a light passage region 560a.

When no magnetic fields are generated by the coils 540, nanoparticles 530 are uniformly dispersed in the dispersion medium 520, as shown in part (a) of FIG. 36. When predetermined currents are supplied to the coils 540, the nanoparticles 530 uniformly dispersed in the dispersion medium 520 are uniformly attracted to the coils 540. As a result, the variable-refractive-index plate 560 has a comparatively high refractive index determined by the refractive index of the dispersion medium 520 and the nanoparticles 530.

Thus, the refractive index of a refractive-index variable plate can be increased if coils 540 are provided in a back surface in a light passage region.

Figure 37:
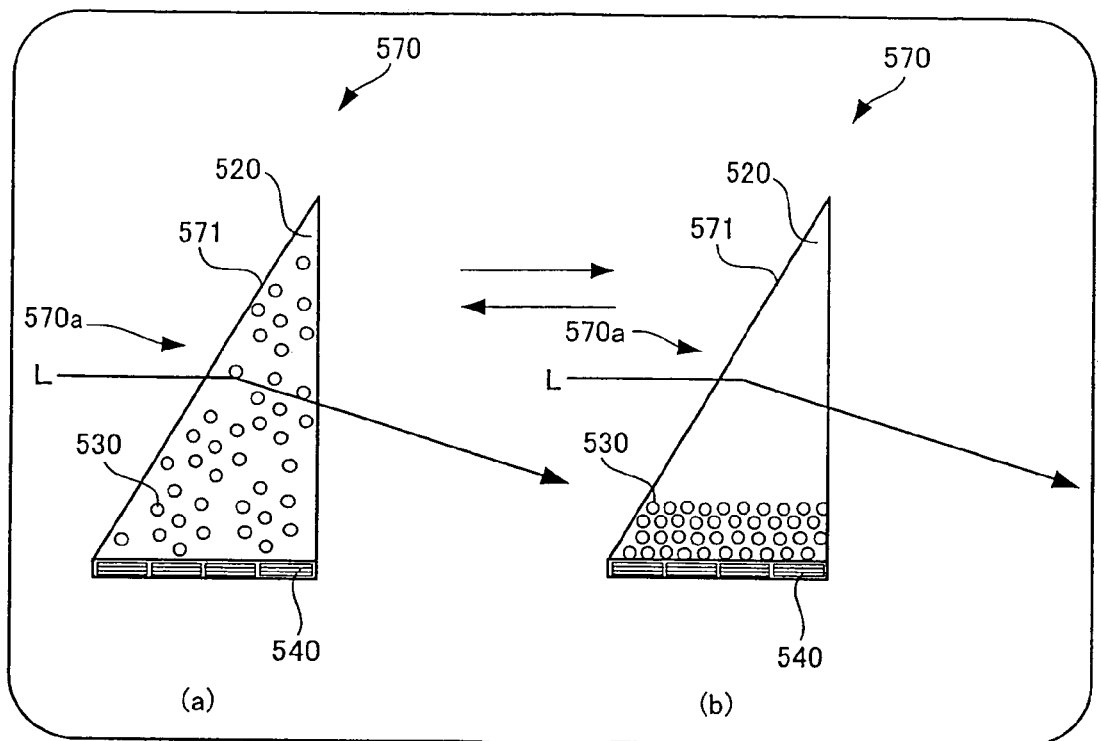
FIG. 37 is a diagram showing a magnetophoretic variable-refractive-index prism which is a twenty-fifth embodiment of the optical element of the present invention.

FIG. 37 is a diagram showing a magnetophoretic variable-refractive-index prism 570 which is a twenty-fifth embodiment of the optical element of the present invention.

The variable-refractive-index prism 570 shown in FIG. 37 has a container 571 having the shape of a prism similar to the prism 410 shown in FIG. 31, a transparent dispersion medium 520, which may be the same as that shown in FIGS. 33 to 35, and transparent magnetic nanoparticles 530, which may be the same as those shown in FIGS. 33 to 35. The dispersion medium 520 and the nanoparticles 530 are enclosed in the container 571. The variable-refractive-index prism 570 also has coils 540 provided in such positions on the container 571 as not to interfere with passage of light through a light passage region 570a.

When no magnetic fields are generated by the coils 540, the nanoparticles 530 are uniformly dispersed in the dispersion medium 520, as shown in part (a) of FIG. 37. At this time, the prism 570 has a refractive index according to the dispersion medium 520 and the amount of nanoparticles 530 existing in the light passage region 570a, such that light L which enters the prism 410 is refracted comparatively largely.

When magnetic fields are generated by the coils 540, the nanoparticles 530 uniformly dispersed in the dispersion medium 520 are attracted by the magnetic fields generated by the coils 540, as shown part (b) of FIG. 37. The refractive index of the prism 570 changes to a refractive index determined by only the refractive index of the dispersion medium 520. The refractive index at this time is lower than that in the state shown in part (a) of FIG. 37 and light L which enters the prism 570 is refracted through a small angle.

Figure 38:
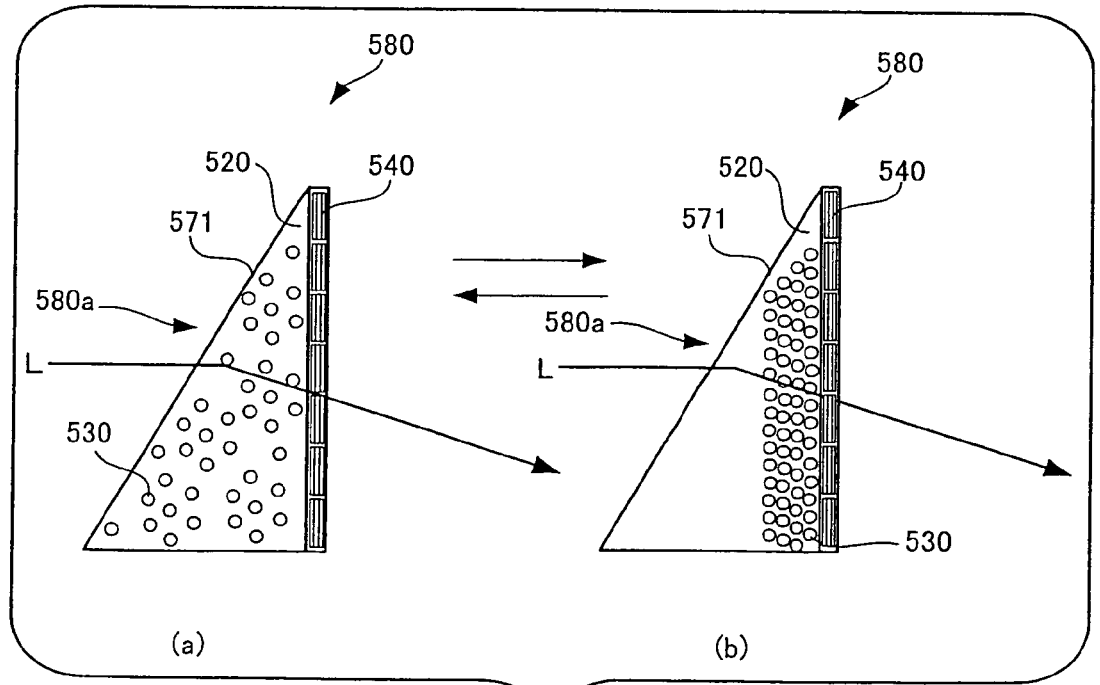
FIG. 38 is a diagram showing a magnetophoretic variable-refractive-index prism which is a twenty-sixth embodiment of the optical element of the present invention.

FIG. 38 is a diagram showing a magnetophoretic variable-refractive-index prism 580 which is a twenty-sixth embodiment of the optical element of the present invention.

The prism 580 shown in FIG. 38 has the same construction as that of the prism 570 shown in FIG. 37, but coils 540 are placed on the back surface in the light passage region 580a.

When predetermined currents are supplied to the coils 540, nanoparticles 530 uniformly dispersed in the dispersion medium 520 are attracted to the coils 540, as shown in part (b) of FIG. 38. The refractive index of the prism 580 is thereby increased to largely refract light L entering the prism 580.

Thus, a magnetophoretic optical element can also be realized as a variable-refractive-index prism.

If plural coils are placed in a stripe pattern, a magnetic field pattern similar to the cathode 141 electric field pattern shown in part (a) of FIG. 16 can be formed. If plural coils differing in size are placed on concentric circles, a magnetic field pattern similar to the cathode 142 electric field pattern shown in part (b) of FIG. 16 can be formed. If small coils are arranged in matrix form, a magnetic field pattern similar to the cathode 143 electric field pattern shown in part (c) of FIG. 16 can be formed.

While the coils capable of generating magnetic fields by being supplied with currents have been described as an example of the magnetic field generator in accordance with the present invention, the magnetic field generator in accordance with the present invention may be a permanent magnet which generates a magnetic field by itself. In such a case, magnetophoresis of the dispersoid is realized by moving the permanent magnet.

Basic embodiments for implementation of the concept of the present invention have been described. For practical use of the variable-focus lens provided as the optical element used in the present invention, however, it is preferable to use a device for preventing foreign materials or water droplets from being attached to a portion on the optical path to cause a deterioration of the lens performance.

For example, it is preferable to apply a water-repellent film on an external surface intersecting the optical path of the container containing a fluid (which surface hereinafter referred to as "light-transmissive surface"). If the light-transmissive surface is given water repellency, attachment of foreign materials and water droplets or the like is prevented and high transmissivity of the optical element can be maintained. As a material constituting this water-repellent coating, a silicone resin, a block copolymer of organopolysiloxane, a fluorine-based polymer, polytetrafluoroethane and the like are preferred.

It is also preferable to apply a hydrophilic film on the light-transmissive surface of the container constituting the optical element. Attachment of foreign materials to the light-transmissive surface can also be prevented by giving a hydrophilicity and oil repellency to the light-transmissive surface. As the hydrophilic film, a film formed of an acrylate polymer, a film coated with a surfactant such as a nonionic organosilicone-based surfactant and the like are preferred. As a method of making the hydrophilic film, plasma polymerization of a silane monomer, ion beam processing or the like may be used.

It is also preferable to apply a photocatalyst on the light-transmissive surface of the container constituting the optical element. The photocatalyst reacting with light decomposes a contamination or the like to keep the light-transmissive surface clean.

Further, it is preferable to apply an antistatic film on the light-transmissive surface of the container constituting the optical member. If static electricity is accumulated on the light-transmissive surface of the container, or if the light-transmissive surface is charged through the electrodes, there is a possibility of foreign materials and dust sticking to the light-transmissive surface. Attachment of such unnecessary materials can be prevented by applying an antistatic film on the light-transmissive surface. The transmissivity of the optical member is thereby maintained. Preferably, the antistatic film is formed of a polymer alloy-based material. Particularly preferably, the polymer alloy-based material is a polyether-based material, polyether ester amide-based material, a material having a cationic group, or [Reolex] (commercial name, DAI-ICHI KOGYO SEIYAKU CO., LTD.). Preferably, the antistatic film is made-by a mist method.

An antifouling material may be used for the container constituting the optical member. A fluororesin is preferred as the antifouling material. More specifically, a fluorine-containing alkyl alkoxysilane compound, a fluoroalkyl group-containing polymer or oligomer and the like are preferred. One having a functional group crosslinkable to the above-mentioned curable resin is particularly preferred. Preferably, the amount of addition of the antifouling material is set to the minimum necessary for the desired antifouling effect.

A digital camera incorporating one of the above-described various optical elements will be described.

Figure 39:
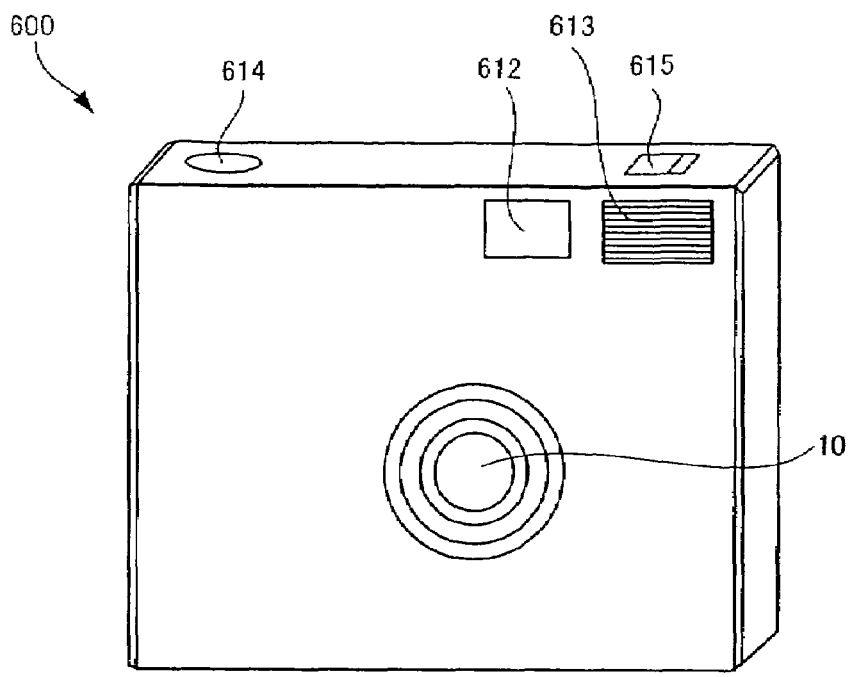
FIG. 39 is a front perspective view obliquely from above of an external appearance of a digital camera incorporating a variable-focus lens.
Figure 40:
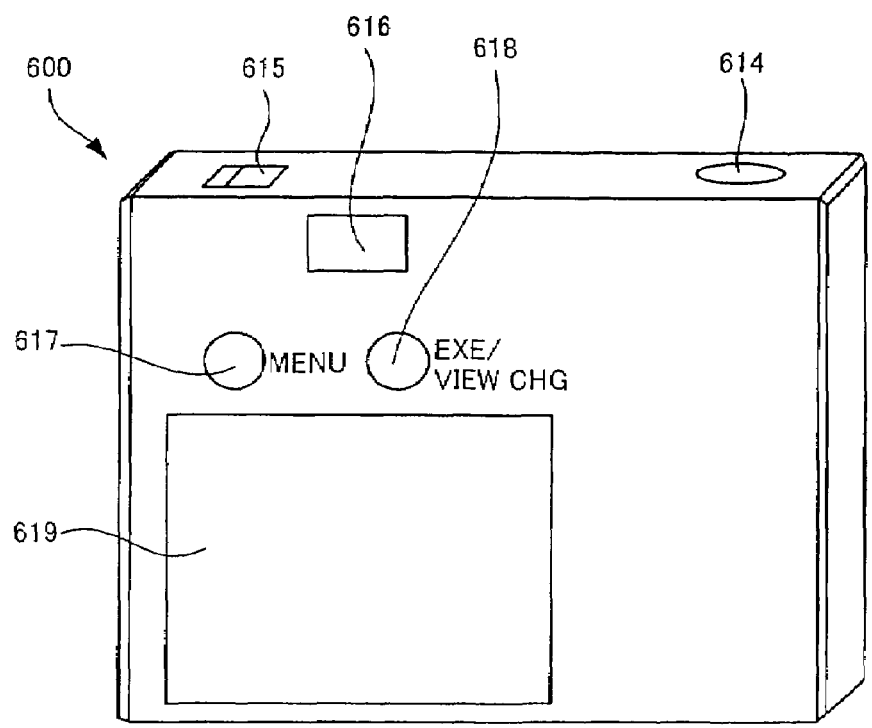
FIG. 40 is a rear perspective view obliquely from above of an external appearance of the digital camera.

FIG. 39 is a front perspective view obliquely from above of an external appearance of a digital camera which is a first embodiment of an image taking apparatus in accordance with the present invention. FIG. 40 is a rear perspective view obliquely from above of an external appearance of the digital camera shown in FIG. 39.

As shown in FIG. 39, the above-described variable-focus lens 10 shown in FIG. 1 is provided in a central front portion of the digital camera 600. An optical finder objective window 612 and an auxiliary light emitting section 613 are provided in upper front portions of the digital camera 600. A shutter button 614 and a slide-type power switch 615 are provided in upper surface portions of the digital camera 600.

Further, an optical finder ocular window 616, a menu switch 617, an execution/view change switch 618 and an image monitor 619 are provided in rear surface portions of the digital camera 600, as shown in FIG. 40.

Figure 41:
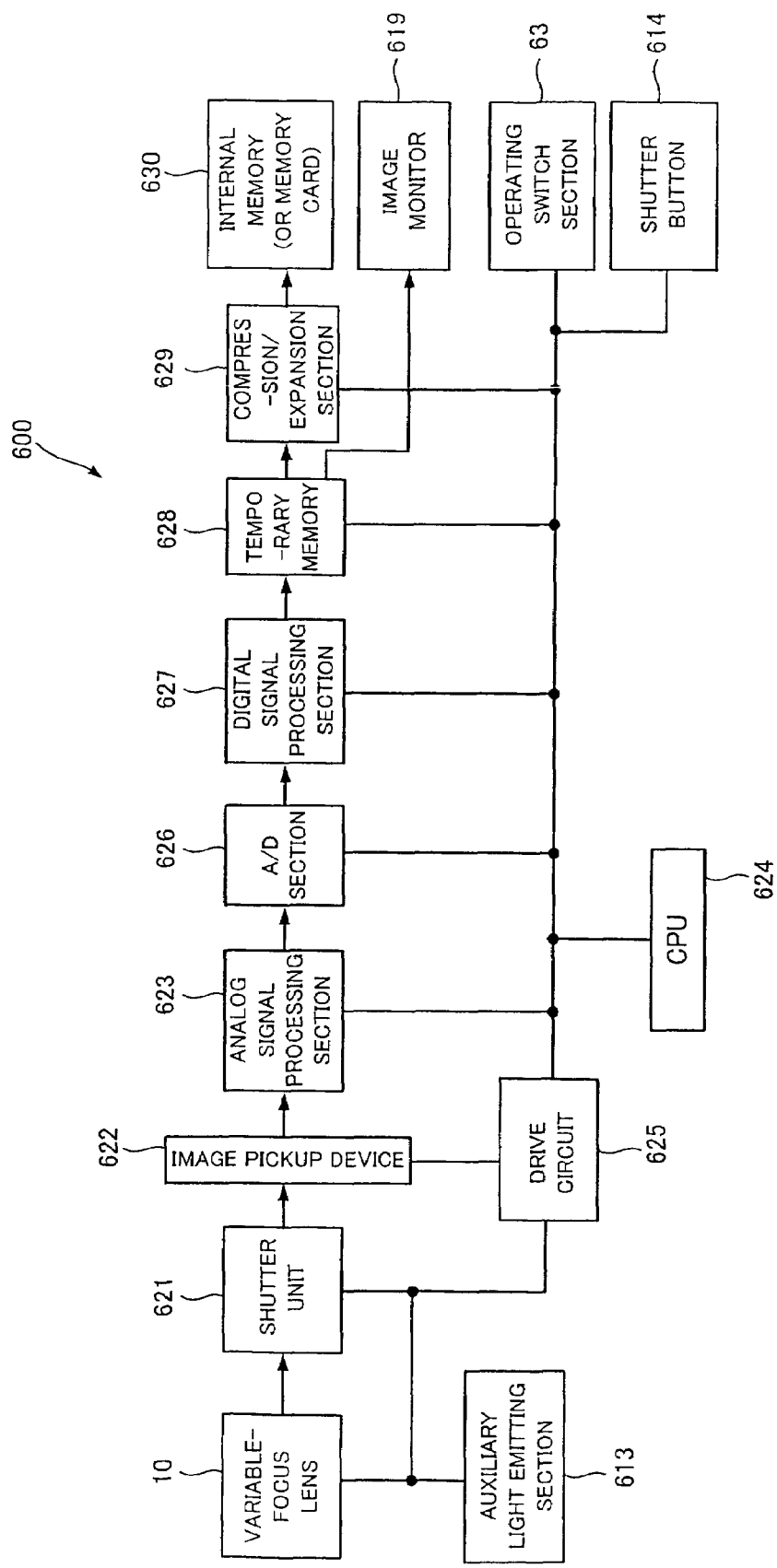
FIG. 41 is a block diagram showing a circuit configuration of the digital camera.
Figure 42:
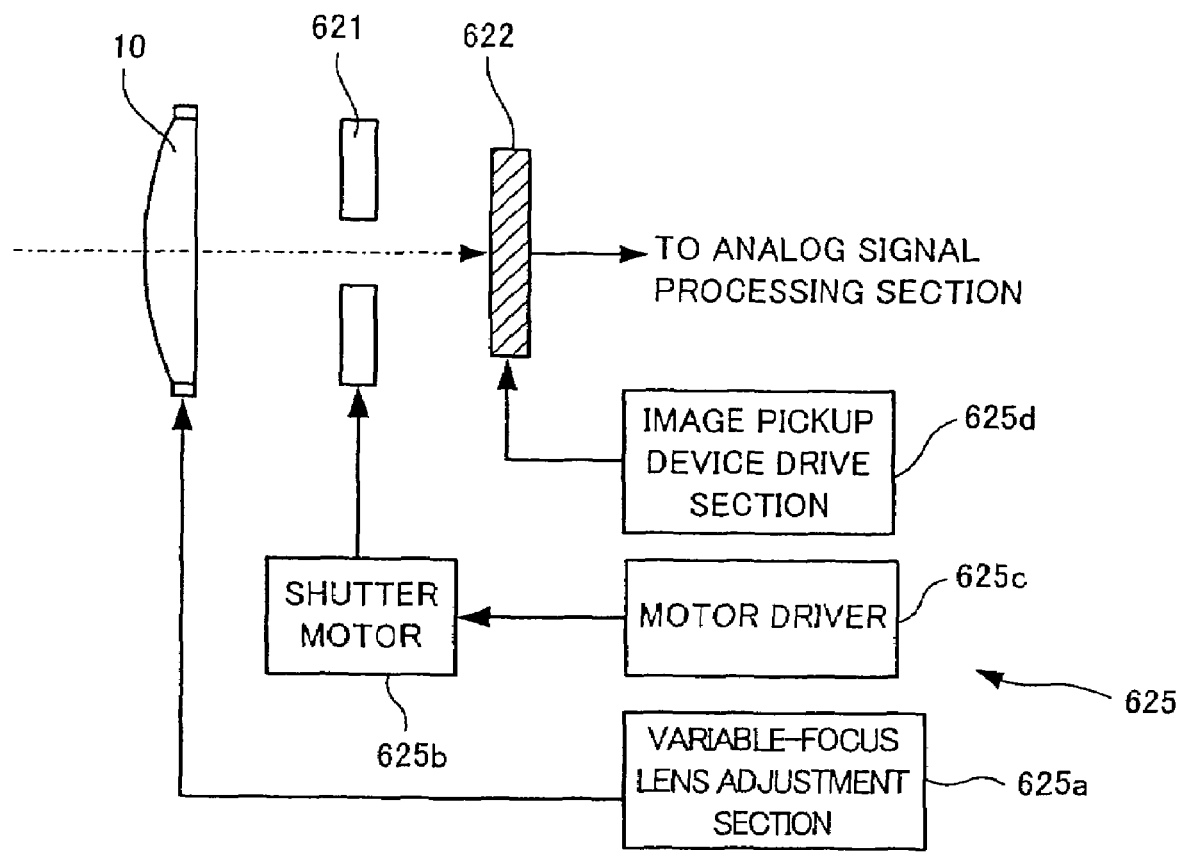
FIG. 42 is a diagram showing the placement and configuration of a fluid lens, a shutter unit, an image pickup device and a drive circuit.

FIG. 41 is a block diagram showing a circuit configuration of the digital camera shown in FIG. 39. FIG. 42 is a diagram showing the placement and configuration of a fluid lens, a shutter unit, an image pickup device and a drive circuit shown in FIG. 41.

The digital camera 600 has the variable-focus lens 10 and the auxiliary light emitting section 613. The digital camera 600 also has the shutter unit 621, the image pickup device (CCD) 622, an analog signal processing section 623, a CPU 624 for performing overall control of the digital camera 600, the drive circuit 625, and an analog/digital (AD) section 626. As shown in FIG. 42, the drive circuit 625 has a variable-focus lens adjustment section 625a for changing the focal length in the light passage region by controlling the voltage applied to the variable-focus lens 10. The drive circuit 625 includes a shutter motor 625b for driving the shutter unit 621, a motor driver 625c for applying a voltage to the shutter motor 625b, and an image pickup device drive section 625d for driving the image pickup device 622.

Subject light coming in via the variable-focus lens 10 and the shutter unit 621 enters the image pickup device 622. The image pickup device 622 converts the subject light into an electrical signal, i.e., an analog image signal, and outputs this signal to the analog signal processing section 623.

The analog signal processing section 623 performs processing including noise reduction processing on the analog image signal output from the image pickup device 622, and outputs the processed analog image signal to the A/D section 626. The A/D section 626 performs A/D (analog/digital) conversion processing on the analog image signal and outputs a digital image signal obtained by the conversion processing.

The digital camera 600 also has a digital signal processing section 627, a temporary memory 628, a compression/expansion section 629, an internal memory (or a memory card) 630 and the above-mentioned image monitor 619. The digital image signal converted by A/D conversion processing in the A/D section 626 is input to the digital signal processing section 627. The digital signal processing section 627 performs predetermined digital signal processing on the input digital image signal to complete image data representing the subject image of the present imaged scene, and temporarily stores the image data in the temporary memory 628. The data stored in the temporary memory 628 is compressed by the compression/expansion section 629 and is thereafter recorded in the internal memory (or memory card) 630. In some image taking mode, the data may be directly recorded in the internal memory 630 without undergoing the compression step. The data stored in the temporary memory 628 is read out to the image monitor 619 to enable the subject image to be displayed on the image monitor 619.

The digital camera 600 further has an operating switch section 631 including the menu switch 617 and the execution/view change switch 618, and the shutter button 614. When an image is taken, the operating switch section 631 is operated to set the system in a desired picture taking condition, and the shutter button 614 is depressed. Since the above-described variable-focus lens 10 is provided in the digital camera 600, the digital camera 600 can be realized as a camera simpler in construction and smaller in size and having improved impact resistance in comparison with conventional digital cameras having a group of plural lenses for changing the focal length.

A digital camera which is a second embodiment of the image taking apparatus in accordance with the present invention, and in which the variable-refractive-index plate 210 shown in FIG. 19 is incorporated will be described. The construction of the digital camera 600,described as the first embodiment with reference to FIG. 39 and the construction of the digital camera described below as the second embodiment are generally equal to each other. The same components are indicated by the same reference characters and description will be made by considering points of difference.

Figure 43:
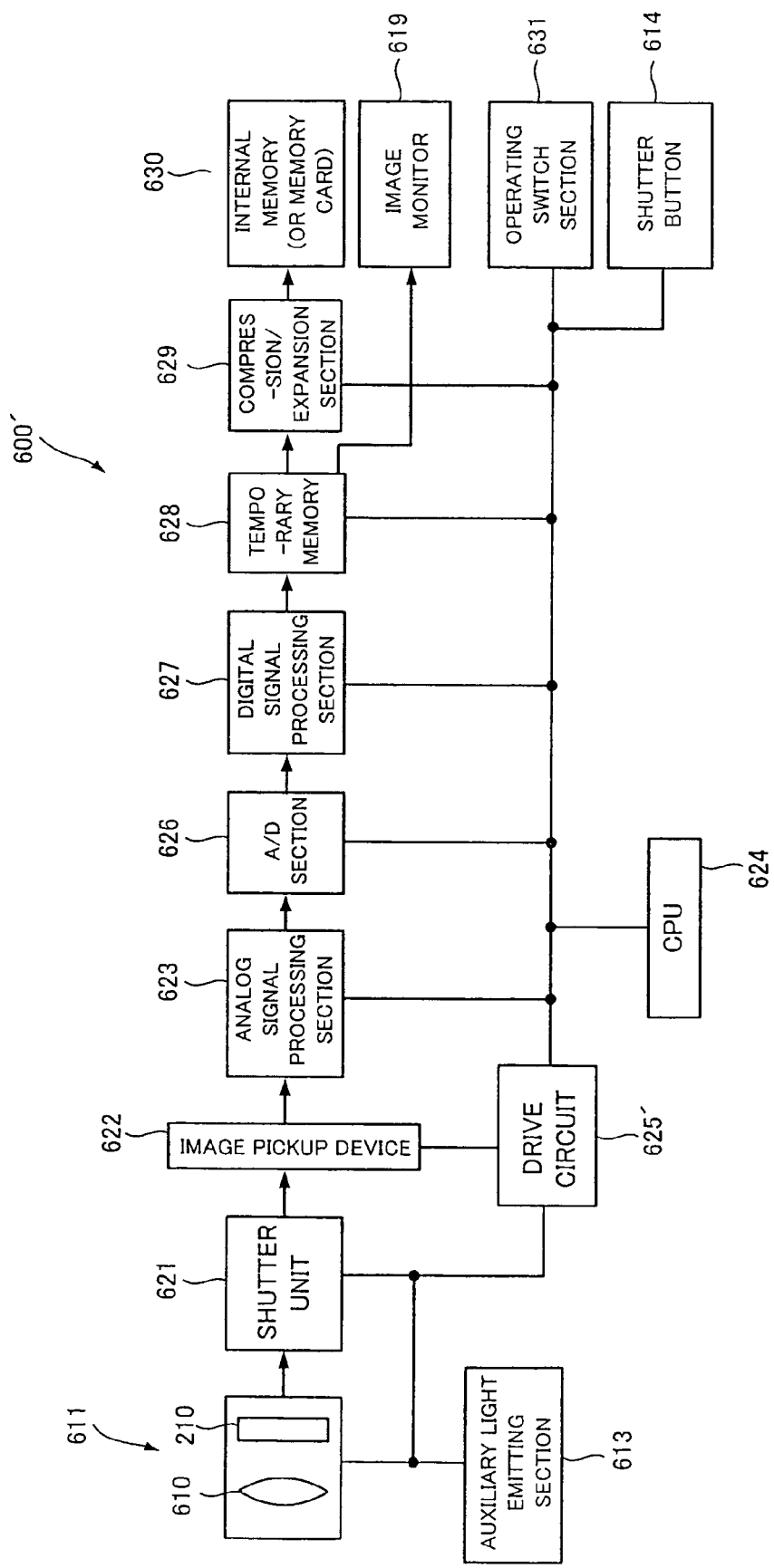
FIG. 43 is a block diagram showing a circuit configuration of a digital camera incorporating the variable-refractive-index plate.
Figure 44:
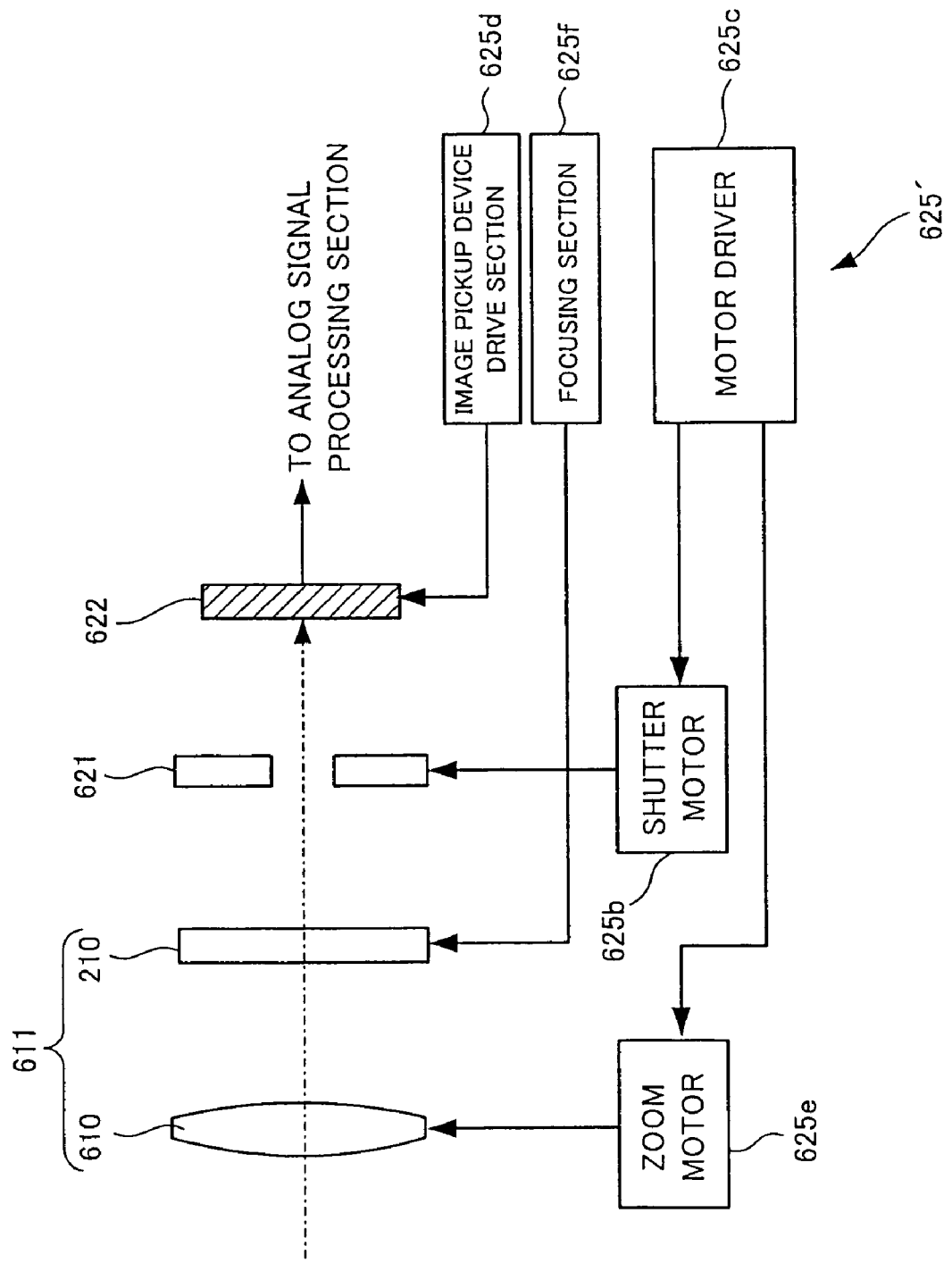
FIG. 44 is a diagram showing the placement and configuration of the variable-refractive-index plate, a shutter unit, an image pickup device and a drive circuit.

FIG. 43 is a block diagram showing a circuit configuration of a digital camera 600' in which the variable-refractive-index plate 210 shown in FIG. 19 is incorporated. FIG. 44 is a diagram showing the placement and configuration of the variable-refractive-index plate, a shutter unit, an image pickup device and a drive circuit shown in FIG. 43.

The components of the digital camera 600' in the present embodiment are generally the same as those of the digital camera 600 in the first embodiment shown in FIG. 41. However, an image taking lens section 611 constituted by a zoom lens 610 and the variable-refractive-index plate 210 is provided in place of the variable-focus lens 10 shown in FIG. 41.

As shown in FIG. 44, the drive circuit 625' includes a shutter motor 625b, a motor driver 625c and an image pickup device drive section 625d, which are the same as those shown in FIG. 42. The drive circuit 625' further includes a zoom motor 625e for driving the zoom lens 610 and a focusing section 625f which performs focusing through two-step control of the refractive index by turning on and off the voltage applied to the electrodes of the variable-refractive-index plate 210.

To take an image, the camera is set in a desired picture-taking condition by operating the operating switch section 631. The shutter button 214 is then depressed. Since the above-described variable-refractive-index plate 210 is incorporated in the digital camera 600', the digital camera 600' can be realized as a camera simpler in construction and smaller in size and having improved impact resistance in comparison with conventional digital cameras having a mechanism for driving a focusing lens.

While applications of the embodiments of the image taking apparatus in accordance with the present invention to digital cameras have been described by way of example, the image taking apparatus of the present invention may also be applied to a silver-salt camera, a portable telephone, and other devices.

What is claimed is:

1. An optical element, comprising:
 a container which is light-transmissive at least in a light passage region;
 a light-transmissive dispersion medium enclosed in the container;
 a light-transmissive dispersoid dispersed in the dispersion medium and having a refractive index different from the refractive index of the dispersion medium; and
 an electromagnetic field generator which controls the refraction of light passing through the light passage region by moving the dispersoid dispersed in the dispersion medium by an electromagnetic force;

wherein the electromagnetic field generator causes the dispersoid to migrate towards a pole;

wherein the electromagnetic field generator is an electrode used to cause electrophoresis of the dispersoid; and wherein the dispersoid comprises charged particles, and an electrode having such a polarity as to attract the dispersoid is placed in such a position on the container as to surround the light passage region.

2. An optical element, comprising:

a container which is light-transmissive at least in a light passage region;

a light-transmissive dispersion medium enclosed in the container;

a light-transmissive dispersoid dispersed in the dispersion medium and having a refractive index different from the refractive index of the dispersion medium; and an electromagnetic field generator which controls the refraction of light passing through the light passage region by moving the dispersoid dispersed in the dispersion medium by an electromagnetic force;

wherein the electromagnetic field generator causes the dispersoid to migrate towards a pole;

wherein the electromagnetic field generator is an electrode used to cause electrophoresis of the dispersoid; and wherein the dispersoid is charged particles, and a light-transmissive electrode having such a polarity as to attract the dispersion is placed in the light passage region of the container.

* * * * *